US007782486B2

(12) United States Patent
Nakano et al.

(10) Patent No.: US 7,782,486 B2
(45) Date of Patent: Aug. 24, 2010

(54) IMAGE PROCESSING METHOD, PROGRAM PRODUCT, IMAGE PROCESSING DEVICE, IMAGE FORMING APPARATUS AND IMAGE FORMING SYSTEM FOR LIMITING INK QUALITY WHEN PRINTING ON BOTH SIDES OF A PRINT MEDIUM

(75) Inventors: Naoki Nakano, Kanagawa (JP); Takashi Kimura, Kanagawa (JP); Masanori Hirano, Kanagawa (JP); Masakazu Yoshida, Kanagawa (JP); Shigetaka Sakakibara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1011 days.

(21) Appl. No.: 11/515,317

(22) Filed: Sep. 1, 2006

(65) Prior Publication Data

US 2007/0064031 A1 Mar. 22, 2007

(30) Foreign Application Priority Data

Sep. 1, 2005 (JP) ............................. 2005-253017
Oct. 25, 2005 (JP) ............................. 2005-310113

(51) Int. Cl.
*G06K 1/12* (2006.01)
*B41J 2/01* (2006.01)
*B41J 2/205* (2006.01)

(52) U.S. Cl. ........................... 358/1.9; 347/15; 347/101

(58) Field of Classification Search .................. 358/1.9, 358/2.1, 2.99, 3.01, 3.23, 3.26, 501, 502, 358/504, 518, 519, 520, 521, 523, 524, 525, 358/529, 530, 538; 382/162, 167; 345/589, 345/590; 347/1, 2, 3, 15, 16, 101, 105
See application file for complete search history.

(56) References Cited

U.S. PATENT DOCUMENTS 4,795,284 A 1/1989 Yumoto et al.
4,990,939 A 2/1991 Sekiya et al.
5,172,139 A 12/1992 Sekiya et al.
5,293,182 A 3/1994 Sekiya et al.
5,389,962 A 2/1995 Sekiya et al.

(Continued)

FOREIGN PATENT DOCUMENTS

JP 06-134982 5/1994

(Continued)

OTHER PUBLICATIONS

Japan Patent Office, English machine translation of "Apr. 21, 2010 Japanese office action in connection with counterpart Japanese patent application No. 2005-253017".*

(Continued)

*Primary Examiner*—Mark K Zimmerman
*Assistant Examiner*—Peter L Cheng
(74) *Attorney, Agent, or Firm*—Cooper & Dunham LLP

(57) ABSTRACT

An image processing method for an image forming apparatus which is capable of performing double face printing is provided, wherein color space transformation processes that differ between single face printing and double face printing are performed. In addition, an image processing method for an image forming apparatus which is capable of performing double face printing is provided, wherein input tone transformation processes and adhering recording liquid quantity limiting processes that differ between double face printing and single face printing are performed.

18 Claims, 28 Drawing Sheets

U.S. PATENT DOCUMENTS

| | | | |
|---|---|---|---|
| 5,400,065 A | | 3/1995 | Tomono et al. |
| 5,412,413 A | | 5/1995 | Sekiya et al. |
| 5,600,356 A | | 2/1997 | Sekiya et al. |
| 6,313,925 B1 | * | 11/2001 | Decker et al. ................ 358/1.9 |
| 6,578,944 B1 | | 6/2003 | Kamei et al. |
| 6,752,481 B1 | * | 6/2004 | Takahashi et al. .............. 347/9 |
| 6,923,520 B2 | | 8/2005 | Oikawa et al. |
| 7,083,247 B2 | | 8/2006 | Yoshida et al. |
| 2002/0118380 A1 | * | 8/2002 | Krueger et al. ............... 358/1.9 |
| 2003/0047099 A1 | * | 3/2003 | Hanyu ........................ 101/484 |
| 2004/0004644 A1 | * | 1/2004 | Komatsu et al. .............. 347/15 |
| 2006/0181562 A1 | * | 8/2006 | Hirano et al. ................. 347/15 |

FOREIGN PATENT DOCUMENTS

| | | | |
|---|---|---|---|
| JP | 9-123431 | | 5/1997 |
| JP | 2001-071539 | | 3/2001 |
| JP | 2001-260485 | * | 9/2001 |
| JP | 2001-310506 | | 11/2001 |
| JP | 2002-36528 | | 2/2002 |
| JP | 2003-219191 | | 7/2003 |
| JP | 2005-53087 | | 3/2005 |
| JP | 2005-207952 | | 8/2005 |
| WO | WO 2005/011983 A1 | * | 2/2005 |

OTHER PUBLICATIONS

Apr. 21, 2010 Japanese official action in connection with counterpart Japanese patent application No. 2005-253017.

* cited by examiner

SINGLE FACE PRINTING

DOUBLE FACE PRINTING

SINGLE FACE PRINTING

DOUBLE FACE PRINTING

Comparison Of Ink Adhesion Quantity (Tertiary Color)

IMAGE PROCESSING METHOD, PROGRAM PRODUCT, IMAGE PROCESSING DEVICE, IMAGE FORMING APPARATUS AND IMAGE FORMING SYSTEM FOR LIMITING INK QUALITY WHEN PRINTING ON BOTH SIDES OF A PRINT MEDIUM

BACKGROUND

1. Technical Field

This disclosure relates to an image processing method, a program, an image processing device, an image forming apparatus and an image forming system.

2. Description of the Related Art

As an image forming apparatus such as a printer, a facsimile, a copying machine, and a composite machine thereof, for example, an ink jet recording apparatus in which a liquid drop ejecting head is used for a recording head is known. An ink jet recording apparatus performs image formation (recording, character printing, image printing, and printing may be used as synonyms.) by ejecting ink as recording liquid from an ink recording head onto a paper form (which is not limited to a paper but includes an OHP sheet, etc., means an object to which an ink drop or other liquid can adhere, and may be called a medium to be recorded, a recording medium, a recording paper, or a recording paper form).

In order that such an ink jet recording apparatus spreads from a personal field to an office field, the following two main problems have to be solved. First, recording speed is provided as one problem. In a general ink jet recording apparatus except a special type for industry, a recording head which is much smaller than a recording paper form scans the paper form many times and ink drops are sprayed, thereby performs recording. This is sort of a "line" recording method and rather disadvantageous with respect to recording speed, compared to an electrophotographic image forming apparatus for performing paper form (page) unit, that is, "surface" recording.

In order to overcome the disadvantage with respect to recording speed, the improvement of scanning speed by making the frequency of jetting of ink drops be higher and the improvement of efficiency of a scanning sequence such as the reduction of the number of scanning by sizing up a recording head or performing bidirectional recording and the minimum control such that scanning is performed on only an image data recording portion have been employed. Accordingly, in regard to a small or middle number of printings, rather, recording speed higher than that of electrophotography can be realized.

As the second problem, the compatibility with normal papers is provided in regard to the cost. When a special purpose paper is used, significantly high quality imager reproduction can be made in regard to an ink jet recording image, and in a recent ink jet recording apparatus for a personal application, an image quality as if it were that of a photograph can be obtained.

However, these special purpose papers are commonly expensive and it is difficult to introduce them when a tight cost management is required in a company, etc., and since such an image quality is required for an image output for an office application, it is a large demerit to form a high quality image on only the special purpose papers.

Therefore, ink composition is improved in order to have the compatibility with normal papers, and, for example, the development of a lower-permeable dye-type ink, the utilization of a fixation adjuvant, the development of a pigment-type ink, etc., are challenged to, so that the most recent model can form an image with a quality comparable to that of an electrophotographic image forming apparatus, even for normal papers which are generally utilized in an office or paper forms which are generally utilized as a paper norm for copy.

Thus, an ink jet recording apparatus has also been a very attractive product in an office by the improvement with respect to speed and image quality. Particularly, since the advantage thereof with respect to the cost is high and miniaturization thereof is easy compared to a laser printer, the utilization on desktop also proceeds.

However, ink jet recording in which fixation is performed by utilizing the permeation of a coloring material into a paper form and which is different from a laser printer having a mechanism for fixing a coloring material on the surface of a paper form and an image forming apparatus for offset printing, etc., always has a problem or constraint involved in such a permeation process.

That is, there is provided a problem of cockling such that a paper form swells by water content contained in ink and the deformed paper contacts a recording head so as to contaminate the recording surface thereof. It is necessary to decrease the gap between a recording head and a paper form as much as possible in order to improve the precision of an ink drop jetting position. However, since an approach for the prevention of swelling, etc., is not applied to normal papers used in an office, which is different from special purpose papers, a contact of the swelled paper and the head may cause defective image output when the gap is set to be too small.

Also, problems may be caused such that undried ink dropped on the surface of a paper form contacts and pass along a member of conveyance mechanism whereby ink adhering to the member contaminates the surface of a paper form and undried ink on the surface of an ejected paper form contaminates the back surface of a subsequently ejected paper form.

Against these problems, conventionally employed are means of reducing a physical contact surface by increasing the gap (distance) between a recording hand and a paper form, of retaining a drying time by optimizing a character printing sequence or of providing a heater for forced drying, etc.

However, the increase of the gap between a recording head and a paper form is a factor of lowering the precision of a dot position. Also, as stopping is conducted to retain a drying time, the throughput is lowered. Further, the setting of a heater needs to worry about the safety as well as cost up, and in some cases, a warmed paper form may Therefore, an approach from the viewpoint of ink formulation has been developed recently, so that recording can be performed on normal papers without the quality of character printing deteriorating if special means as described above are not necessarily used. For example, ink does not remain on the surface of a paper form but the permeation thereof is rapidly conducted, by increasing the permeability thereof into a paper form, and therefore, the secondary transference by the contact of a component and a paper form can be prevented. Due to such an improvement, an ink jet recording apparatus can realize recording speed comparable to that of a laser printer in regard to "single face recording" (single face printing).

Herein, against the limitation of "single face recording", "double face recording" (double face printing) still requires to retain a drying time and it takes a recording time more than one at the time of "single face recording" due to this drying time. The reason why a drying time has to be retained is to prevent the secondary transference at the re-load (re-setting) of paper forms. Commonly, in a paper form conveyance mechanism, there are provided a roller-shaped component such as a pressurizing control roller or press control roller for pressurizing and sending a paper form for the purpose of preventing the floating and displacement of the paper form. When the recording surface of an undried paper form passes under the pressurizing control roller, undried ink is transferred onto the surface of the pressurizing control roller and the ink is transferred onto the surface of the paper form by the rotation of the control roller as if offset printing were made. Ink having permeated into the paper form is not re-transferred again to such a component at the level of contacting, but under the pressurizing control roller, a situation such that ink in the paper form is forcedly squeezed is provided so that the another transference easily occurs.

In order to reduce such a waiting time, a method of suppressing the quantity of used ink at the time of double face recording has been suggested. For example, it is disclosed in Japanese Patent No. 2879872 to suppress the quantity of used ink by means of thinning, etc., as well as to adjust a waiting time for drying depending on the kind of a recording paper form. This also aims to prevent the secondary transference and back face bleeding, that is, bleeding to the back side which is caused by the permeation of ink recorded on the surface on the front side and lowers the image quality of double face printing.

Also, it is disclosed in Japanese Laid-Open Patent Application No. 09-123431 to determine whether output image data are characters or not and, if they are not characters, to adjust the quantity of ejected ink so as to suppress the quantity of water adhering to a paper form.

Further, it is disclosed in Japanese Laid-Open Patent Application No. 2005-053087 to limit the quantity of adhering ink by means of $\gamma$-correction.

Furthermore, it is disclosed in Japanese Laid-Open Patent Application No. 2002-036528 to limit the quantity of adhering ink by reducing the maximum number of dots per unit surface area at the time of double face printing than one at the time of single face printing, thereby preventing the secondary transcription and the back face bleeding.

However, in regard to the methods disclosed in Japanese Patent No. 2879872, Japanese Laid-Open Patent Application No. 09-123431, and Japanese Laid-Open Patent Application No. 2005-053087 listed above, the quantity of ink adhering to a paper form can be practically limited but a problem occurs such that the density of an image is entirely lowered since the effect of the limitation influences over the entire image.

For example, in regard to an image data which only include a primary color, the quantity of adhering ink is at most that of ink used for single color and solid printing, wherein a quantity of adhering ink for the single color and solid printing is not necessarily an unusable quantity for the double face recording although it depends on image data. Nevertheless, the suppress is forcedly applied to a color phase for which the maximum color gamut can be originally retained, by performing the limitation of ejected quantity or the thinning process, and therefore, the image quality is lowered.

Also, in the method disclosed in Japanese Laid-Open Patent Application No. 2002-036528, an adhesion quantity comparable to one at the time of single face printing can be provided in regard to an image data which only include a primary color and an image quality for a low or middle tone can be comparable to one at the time of single face printing even in regard to secondary or tertiary color image data, but the continuity of tone is lost near the maximum dot numbers. Also, this method can be applied to the processing of an image composed of dots with a single diameter and a problem occurs such that it cannot be applied to the processing of an image composed of dots with plural diameters.

SUMMARY OF THE INVENTION

According to one aspect of the present invention, other is provided an image processing method for producing and processing image data based on input data which image data are sent to an image forming apparatus for forming an image on a paper form on which apparatus a recording head for ejecting a liquid drop of recording liquid is mounted and which apparatus is capable of performing double face printing, wherein color space transformation processes different between single face printing and double face printing are performed when input data are transformed into color apace values for the image forming apparatus.

According to another aspect of the present invention, there is provided an image processing method for producing and processing image data based on input data which image data are sent to an image forming apparatus for forming an image on a paper form on which apparatus a recording head for ejecting a liquid drop of recording liquid is mounted and which apparatus is capable of performing double face printing, wherein input tone transformation processes and adhering recording liquid quantity limiting processes different between a case where double face printing is performed and a case where single face printing is performed are performed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
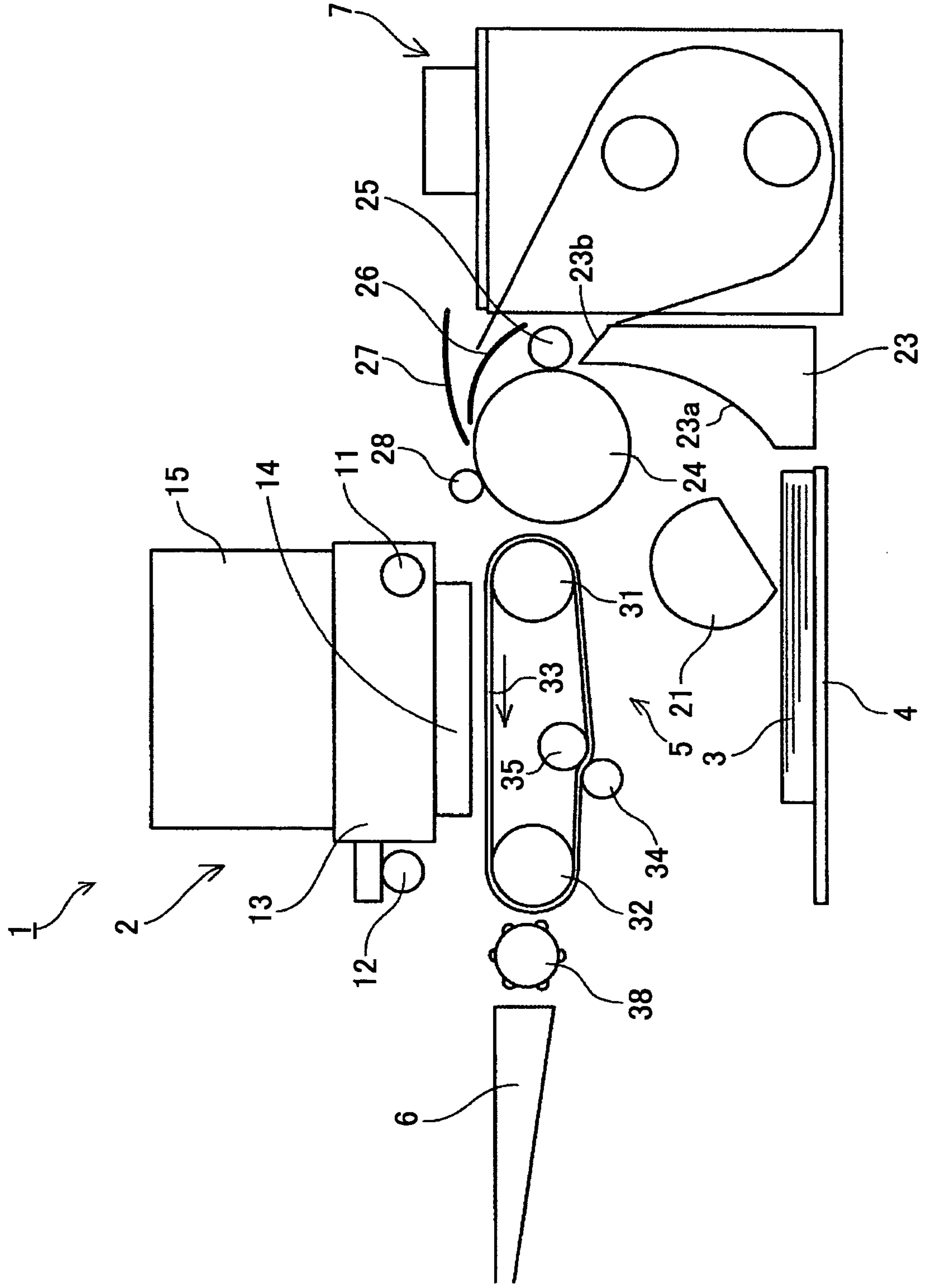
FIG. 1 is a schematic configuration diagram of a mechanism part of an ink jet recording apparatus which shows one example of an image forming apparatus.

The object of the first embodiment of the present invention is to provide an image processing method for reducing waiting time for drying and suppressing the lowering of image quality as much as possible, a program for causing a computer to execute the image processing method, an image processing device provided with the program, an image forming apparatus with a circuit for performing the image processing device, and an image forming system in which the image processing device and the image forming apparatus are combined.

The image processing method according to the first embodiment of the present invention is an image processing method for producing and processing image data based on input data which image data are sent to an image forming apparatus for forming an image on a paper form on which apparatus a recording head for ejecting a liquid drop of recording liquid is mounted and which apparatus is capable of performing double face printing, wherein color space transformation processes different between single face printing and double face printing are performed when input data are transformed into color space values for the image forming apparatus.

Herein, preferably, color space reproduced by a color space transformation process applied at the time of double face printing is a maximum color gamut realizable from an adhering recording liquid quantity such that an adhering recording liquid quantity after transformation=a maximum adhering recording liquid quantity determined at the time of double face printing.

Also, preferably, color space reproduced by a color space transformation process applied at the time of double face printing is a maximum color gamut realizable from an adhering recording liquid quantity such that a maximum adhering recording liquid quantity with respect to a primary color in a color space after transformation≦an adhering recording liquid quantity after transformation≦a maximum adhering recording liquid quantity determined at the time of double face printing.

Also, preferably, color space transformation processes different among objects constituting output image data at the time of double face printing are performed.

Also, preferably, different color space transformation processes are performed by switching predetermined plural color space processing transformation tables. Alternatively, preferably, different color space transformation processes are performed by switching predetermined coefficient tables multiplied by an output value from a color space processing transformation table as a basis. In those cases, preferably, whether the kind of a paper form is capable of performing double face printing or not is determined based on a detection result for a brightness or density of a paper form and switching of the table is performed based on the determination result. Alternatively, preferably, switching of the table is performed based on a detection result from a paper feeding device which previously corresponds to a kind of a paper form. Alternatively, preferably, switching of the table is performed based on a selection result of a user.

The program according to the first embodiment of the present invention is a program for causing a computer to execute a process for producing image data based on input data which image data are sent to an image forming apparatus for forming an image on which apparatus a recording head for ejecting a liquid drop of recording liquid is mounted, wherein the image processing method according to the first embodiment of the present invention is executed by a computer. A computer readable (recording) medium on which the program according to the first embodiment of the present invention is recorded can be also provided. A program product comprising the program according to the first embodiment of the present invention and/or a computer readable (recording) medium on which the program according to the first embodiment of the present invention is recorded can be also provided.

The image processing device according to the first embodiment of the present invention is an image processing device for performing a process for producing and processing image data based on input data which image data are sent to an image forming apparatus for forming an image on which apparatus a recording head for ejecting a liquid drop of recording liquid is mounted, which device is provided with the program according to the first embodiment of the present invention.

The image forming apparatus according to the first embodiment of the present invention is an image forming apparatus for forming an image based on input data on which apparatus a recording head for ejecting a liquid drop of recording liquid is mounted; which apparatus comprises an integrated circuit for a particular application on which the image processing method according to the first embodiment of the present invention is performed (when color space transformation is applied to input data).

The image forming system according to the first embodiment of the present invention is an image forming system comprising the image processing device according to the first embodiment of the present invention and an image forming apparatus for forming an image on which apparatus a recording head for ejecting a liquid drop of recording liquid is mounted or an image forming system comprising the image forming apparatus according to the first embodiment of the present invention and an image processing device for sending image data to the image forming apparatus.

Due to an image processing method, program, image processing device, image forming apparatus or image forming system according to the first embodiment of the present invention, since color space transformation processes different between single face printing and double face printing are performed when input data are transformed into color space values for the image forming apparatus, waiting time for drying is reduced while suppression is applied to a color phase for which an adhering recording liquid quantity may become problematic at the time of double face printing in a color space transformation process and no suppression is applied to (an)other color phase by taking an adhering recording liquid quantity and a color reproduction gamut for each color phase into consideration, so that a color gamut at the time of double face printing can be kept at a maximum, the decrease of a color reproduction gamut for single face printing can be suppressed at a minimum and the lowering of an image quality for double face printing can be suppressed.

The object of the second embodiment of the present invention is to provide an image processing method for reducing waiting time for drying and suppressing the lowering of image quality as much as possible, a program for causing a computer to execute the image processing method, an image processing device for performing the image processing method, an image forming apparatus for performing the image processing method, and an image forming system in which the image processing device and the image forming apparatus are combined.

The image processing method according to the second embodiment of the present invention is an image processing method for producing and processing image data based on input data which image data are sent to an image forming apparatus for forming an image on a paper form on which apparatus a recording head for ejecting a liquid drop of recording liquid is mounted and which apparatus is capable of performing double face printing, wherein input tone transformation processes and adhering recording liquid quantity limiting processes different between a case where double face printing is performed and a case where single face printing is performed are performed.

Herein, preferably, an input tone transformation process is a process for multiplying a certain coefficient K ($K \leqq 1.0$) by an input tone which is proportional to a density when double face printing is performed. In this case, preferably, coefficient K is switched depending on an object constituting output image data. Alternatively, preferably, coefficient K is switched depending on a kind of the paper form. Alternatively, preferably, coefficient K is switched depending on whether a surface for forming an image is a first surface or a second surface. Alternatively, preferably, coefficient K is switched depending on drying time for a first surface and a second surface after an image is formed.

Also, preferably, an adhering recording liquid quantity limiting process is a process for multiplying a certain coefficient S($S \leqq 1.0$) by an adhering recording liquid quantity limiting value which is obtained by a same adhering recording liquid quantity limiting process as that of single face printing when double face printing is performed. In this case, preferably, coefficient S is switched depending on an object constituting output image data. Alternatively, preferably, coefficient S is switched depending on a kind of the paper form. Alternatively, preferably, coefficient S is switched depending on whether a surface for forming an image is a first surface or a second surface. Alternatively, preferably, coefficient S is switched depending on drying time of a first surface and a second surface after an image is formed.

The program according to the second embodiment of the present invention is a program for causing a computer to execute a process for producing image data based on input data which image data are sent to an image forming apparatus for forming an image on which apparatus a recording head for ejecting a liquid drop of recording liquid is mounted and which apparatus is capable of performing double face printing, wherein the image processing method according to the second embodiment of the present invention is executed by a computer. A computer readable (recording) medium on which the program according to second embodiment of the present invention is recorded can be also provided. A program product comprising the program according to the second embodiment of the present invention and/or a computer readable (recording) medium on which the program according to the second embodiment of the present invention is recorded can be also provided.

The image processing device according to the second embodiment of the present invention is an image processing device for performing a process for producing image data based on input data which image data are sent to an image forming apparatus for forming an image on which apparatus a recording head for ejecting a liquid drop of recording liquid is mounted and which apparatus is capable of performing double face printing, which device comprises a device for performing the image processing method according to the second embodiment of the present invention.

The image forming apparatus according to the second embodiment of the present invention is an image forming apparatus for forming an image based on input data on which apparatus a recording head for ejecting a liquid drop of recording liquid is mounted and which apparatus is capable of performing double face printing, which apparatus comprises a device for performing the image processing method according to the second embodiment of the present invention. Herein, preferably, the device is an integrated circuit for a particular application.

The image forming system according to the second embodiment of the present invention is an image forming system comprising an image processing device according to the second embodiment of the present invention and an image forming apparatus for forming an image on which apparatus a recording head for ejecting a liquid drop of recording liquid is mounted and which apparatus is capable of performing double face printing or an image forming system comprising the image forming apparatus according to the second embodiment of the present invention and an image processing device for sending image data to the image forming apparatus.

Due to an image processing method, program, image processing device, image forming apparatus or image forming system according to the second embodiment of the present invention, since input tone transformation processes and adhering recording liquid quantity limiting processes different between a case where double face printing is performed and a case where single face printing is performed are performed, waiting time for drying is reduced while a maximum image quality in a range of causing no disadvantage at the time of double face printing can be kept and the lowering of an image density or unnatural tone can be suppressed for double face printing.

Next, the embodiments of the present invention are described with reference to the drawings below.

Figure 2:
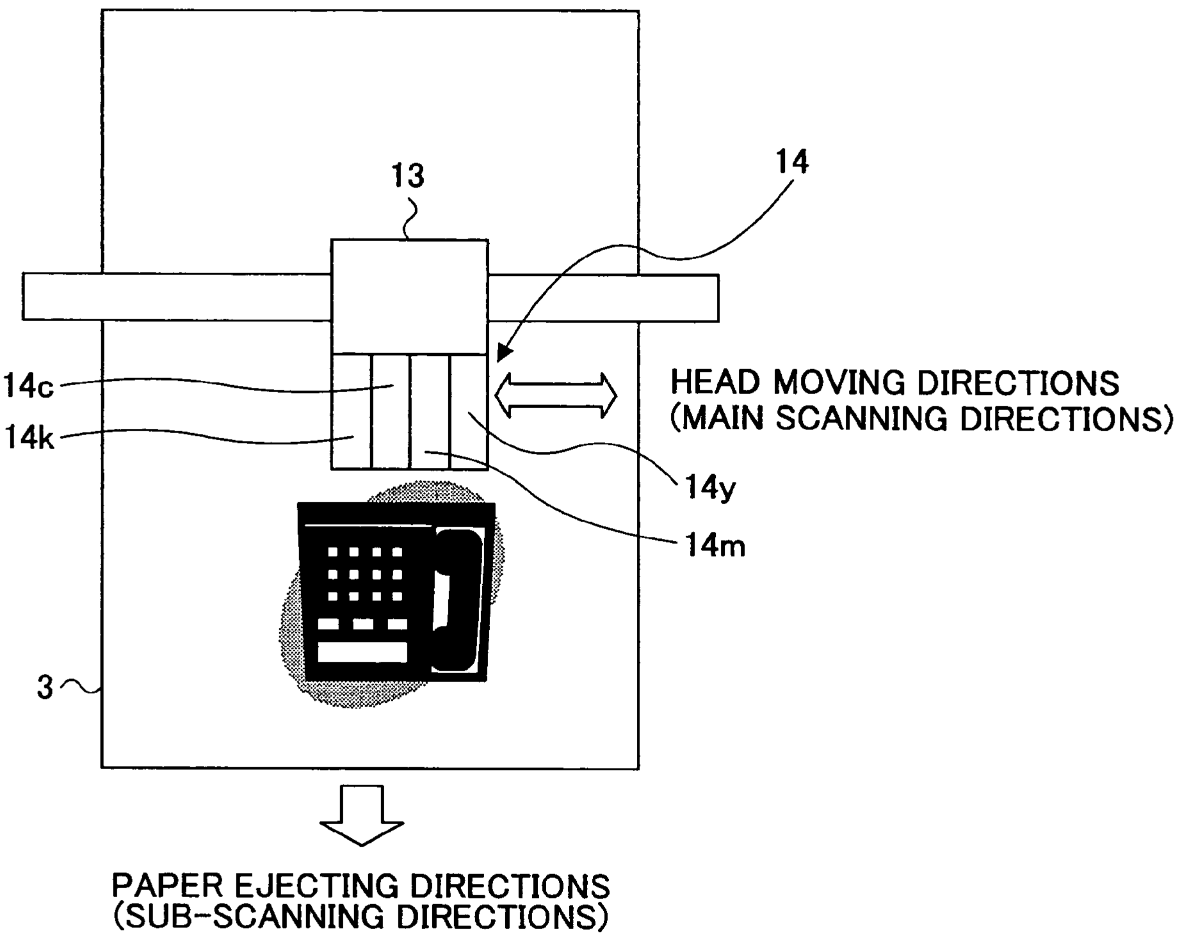
FIG. 2 is an illustrative plan view of the essential part of the mechanism part.
Figure 3:
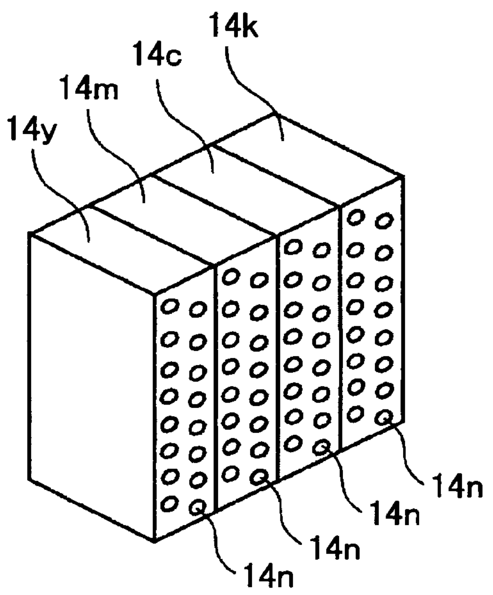
FIG. 3 is an illustrative perspective view for illustrating the structure of a head unit of the apparatus.
Figure 4:
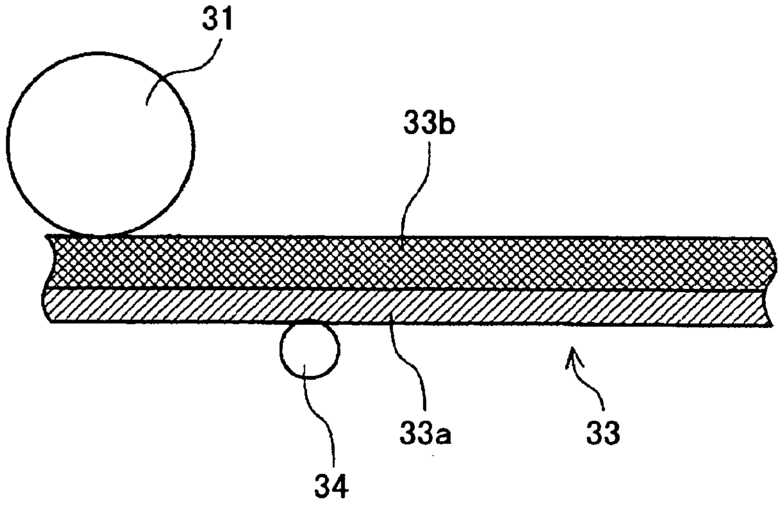
FIG. 4 is an illustrative diagram for illustrating one example of a conveyance belt of the apparatus.

First, one example of an ink jet recording apparatus as an image forming apparatus is described with reference to FIG. 1-4. Herein, FIG. 1 is a schematic configuration diagram of the entire mechanism part of the recording apparatus, FIG. 2 is an illustrative plan view of the essential part of the recording apparatus, FIG. 3 is an illustrative perspective view for illustrating the structure of a head unit of the recording apparatus, and FIG. 4 is an illustrative schematic cross-sectional view of a conveyance belt of the recording apparatus.

The ink jet recording apparatus has an image forming part 2, etc., in the apparatus body 1 and is provided with a paper feeding tray 4 capable of stacking a number of recording media (referred to as "paper forms", below) on the lower side of the apparatus body 1, and after a desired image is recorded by the image forming part 2 while a paper form 3 fed from the paper feeding tray 4 is introduced and the paper form 3 is conveyed to a conveyance mechanism 5, the paper from 3 is ejected onto a ejected paper tray 6 attached to a side of the apparatus body 1.

Also, the ink jet recording apparatus is provided with a double face unit 7 attachable and detachable to the apparatus body 1, and when double ace printing is performed, after the end of one face (surface) printing, the paper form 3 is conveyed along a reverse direction by the conveyance mechanism 5, introduced into the double face unit 7, reversed so that the other face (back face) is a printable face, and sent to the conveyance mechanism 5 again, and after printing on the other face (back face) is completed, the paper form 3 is paper-ejected to the ejected paper tray 6.

Herein, the image forming part 2 slidably holds a carriage 13 on guide shafts 11 and 12 and the carriage 13 moves (main-scans) in directions orthogonal to the conveyance direction of the paper form 3 by a main-scanning motor that is not shown in the figures. A recording head 14 is mounted on the carriage 13, which head is composed of liquid drop ejecting heads in which nozzle orifices 14_n_ (see FIG. 3) being plural ejection orifices for ejecting a liquid drop are arranged. Also, an ink cartridge 15 for providing liquid into the recording head 14 is mounted attachably and detachably. Additionally, a sub-tank instead of the ink cartridge 15 can be mounted so as to supplementally provide ink from a main-tank to the sub-tank.

Herein, although the recording head 14 is, for example, composed of independent four ink jet heads 14_y_, 14_m_, 14_c_, and 14_k_ which are liquid drop ejecting heads for ejecting respective color ink drops for yellow (Y), magenta (M), cyan (C) and black (Bk), as shown in FIGS. 2 and 3, one or plural heads having plural nozzle rows for ejecting respective color ink liquid can be also used. Additionally, the number and arrangement order of colors and are not limited to them.

As an ink jet head for constituting the recording head 14, there can be used a piezoelectric actuator such as a piezoelectric element, a thermal actuator which uses an electrothermal element such as a heat element and utilizes a phase change caused by liquid film boiling, a shape memory alloy actuator which uses a metal phase change caused by a temperature change, and one with an electrostatic actuator using a electrostatic force, etc., as a device for generating energy for ejecting ink.

The paper forms 3 on the paper feeding tray 4 are separated piece by piece by a paper feeding control roller (crescent control roller) 21 and a separation par which is not shown in the figures, paper-fed into the apparatus body 1, and sent to the conveyance mechanism 5.

The conveyance belt 5 has a conveyance guide part 23 for guiding a fed paper form 3 upward along a guide face 23_a_ and guiding a paper form 3 sent from the double face unit 7 along a guide face 23_b_, a conveyance roller 24 for conveying the paper form 3, a pressurizing control roller 25 for pressing the paper form 3 to the conveyance roller 24, a guide member 26 for guiding the paper form 3 to the side of the conveyance roller 24, a guide member 27 for guiding the paper form 3 returned at the time of double face printing to the double face unit 7, and a pressing control roller 28 for pressurizing the paper form 3 sent from the conveyance roller 24.

Further, the conveyance mechanism 5 has a conveyance belt 33 hung on a driving roller 31 and a driven roller 32, a charging roller 34 for charging the conveyance belt 33, a guide roller 35 which opposes the charging roller 34, a guide member (platen plate) for guiding the conveyance belt 33 at a location opposing the image forming part 2, and a cleaning roller made from a porous material as a cleaning device for removing recording liquid (ink) adhering to the conveyance belt 33, which guide member and cleaning roller are not shown in the figures, in order to conduct the conveyance while the planarity of the paper form 3 on the recording head 14 is maintained.

Herein, the conveyance belt 33 is a no-edge-shaped belt, is hung on the driving roller 31 and the driven roller (tension roller) 32, and is configured to rotate to a direction of arrow in FIG. 1 (a direction of conveying a paper form).

The conveyance belt 33 can have a single layer structure, a two layer structure of the first layer (top later) 33_a_ and the second layer (back layer) 33_b_ as shown in FIG. 4, or three or more layer structure. For example, the conveyance belt 33 is composed of a front layer having a paper from adhesion face which is formed by a pure resin material with no controlled resistance and a thickness of approximately 40 μm, for example, an ETF pure material, and a back layer (middle resistance layer, earth layer) with the same material as that of the front layer and carbon-controlled resistance.

The charging roller 34 contacts the front layer of the conveyance belt 33 and is arranged to rotate according to the rotation of the conveyance belt 33. A high voltage originating from a high voltage circuit (high voltage power supply) which is not shown in the figures is applied to the charging roller 34 in accordance with a predetermined pattern.

Also, a paper ejecting roller 38 for sending a paper form 3 on which an image is recorded to the ejected paper tray 6 is provided on the side of the downstream from the conveyance mechanism 5.

In thus configured image forming apparatus, the conveyance belt 33 rotates to the direction of arrow and is positively charged by contacting the charging roller 34 to which a high voltage is applied. In this case, charging is conducted with a predetermined charging pitch by switching the polarity from the charging roller 34 at a predetermined time interval.

Herein, as a paper form 3 is fed and sent on the conveyance belt 33 charged at a high voltage, the inside of the paper form 3 is on the condition of polarization and a charge having a polarity opposite to that of the charge on the conveyance belt 33 is induced on a surface of the paper form 3 which surface contacts the belt 33, so that the charge on the belt 33 and the charge induced on the conveyed paper form 3 are electrostatically attracted to each other and the paper form 3 is electrostatically held on the conveyance belt 33. Thus, the warpage or irregularity of the paper form 3 which is strongly held on the conveyance belt 33 is lost so as to obtain a highly planar surface.

Figure 5:
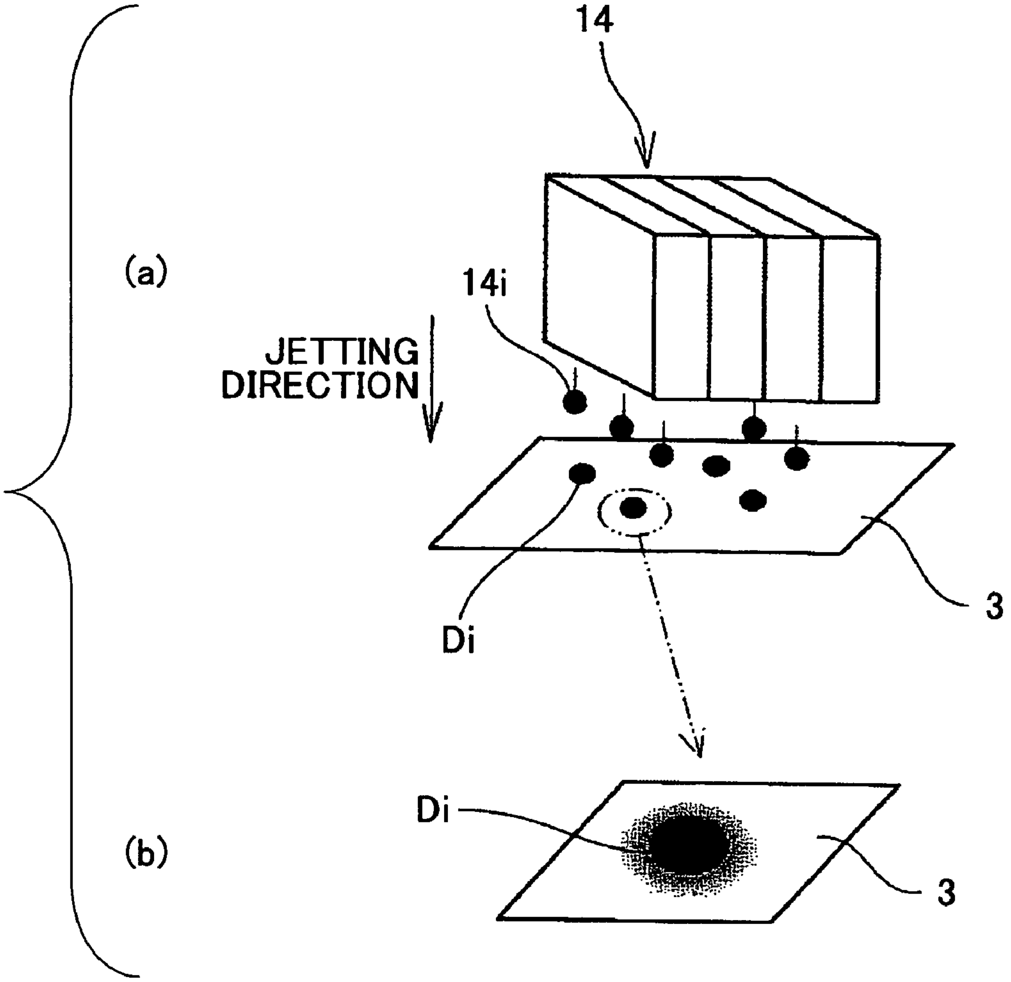
FIG. 5 is an illustrative diagram provided for illustrating an image formation operation by the apparatus.

Then, one line is recorded by moving the paper form 3 while the conveyance belt 33 is rotated, driving the recording head 14 depending on an image signal while the carriage 13 is moved and scans in one direction or both directions, and ejecting (jetting) a liquid drop 14 from the recording head 14 such that an ink drop being a liquid drop is dropped into the stopping paper form 3 and a dot Di is formed, as shown in FIGS. 5 (*a*) and (*b*), and the next line is recorded after the paper form 3 is conveyed by a predetermined range. As a recording end signal or a signal for indicating that the back and of the paper form 3 reaches a recording area, the operation of recording is completed. Additionally, FIG. 5(*b*) is an enlarged view of an area in FIG. 5(*a*) in which area the dot Di is formed.

Thus, the paper form 3 on which an image is formed is paper-ejected onto the ejected paper tray 6 by the paper ejecting roller 38.

Next, ink as a recording liquid used in the ink jet recording apparatus is described below.

As a coloring material for ink used in an image forming apparatus in the present invention, either a pigment or a dye can be used and a mixture thereof can be also used.

[Pigment]

As a pigment, the following pigments are preferably used. Also, plural kinds of these pigments can be mixed and used.

Also, as an organic pigment, there can be provided an azo pigment, a phthalocyanine-type pigment, an anthraquinone-type pigment, a quinacridone-type pigment, a dioxazine-type pigment, a indigo-type pigment, a thioindigo-type pigment, a perylene-type pigment, an isoindolenone-type pigment, aniline black, an azomethyne-type pigment, a rhodamine B lake pigment, carbon blacks, etc.

As an inorganic pigment, there can be provided iron oxides, titanium oxides, calcium carbonate, barium sulfate, aluminum hydroxide, barium yellow, iron blue, cadmium red, chrome yellow, metal powders, etc.

The particle size of a used pigment is preferably 0.01 μm through 0.30 μm, and if it is 0.01 μm or less, the particle size is near that of a dye whereby the light fastness and the feathering deteriorate. On the other hand, if it is 0.30 μm or greater, the clogging of an ejection orifice or the clogging of a filter inside a printer occurs so that the ejection stability cannot be obtained.

As a carbon black used for a black pigment ink, preferable are carbon blacks manufactured by a furnace method or channel method and having a primary particle diameter of 15-40 milli-micron, a specific surface area of 50-300 square meter/g which is determined by a BET method, a DBP oil absorption of 40-150 ml/100 g, a volatile content of 0.5-10%, and a pH value of 2-9. As such, for example, there can be used, for example, No. 2300, No. 900, MCF-88, No. 33, No. 40, No. 45, No. 52, MA7, MA8, MA100, No. 2200B (which are produced by Mitsubishi Chemical Corporation), Raven700, Raven5750, Raven5250, Raven5000, Raven3500, Raven1255 (which are produced by Columbia), Regal400R, Regal330R, Regal660R, MogulL, Monarch700, Monarch800, Monarch880, Monarch900, Monarch1000, Monarch1100, Monarch1300, Monarch1400 (which are produced by CABOT), carbon black FW1, carbon black FW2, carbon black FW2V, carbon black FW18, carbon black FW200, carbon black S150, carbon black S160, carbon black S170, Printex 35, Printex U, Printex V, Printex 140U, Printex 140V, special black 6, special black 5, special black 4A, special black 4 (which are produced by Degussa), etc., but it is not limited to them.

Specific examples of a color pigment are provided below.

As an organic pigment, there can be provided an azo pigment, a phthalocyanine-type pigment, an anthraquinone-type pigment, a quinacridone-type pigment, a dioxazine-type pigment, a indigo-type pigment, a thioindigo-type pigment, a perylene-type pigment, an isoindolenone-type pigment, aniline black, an azomethyne-type pigment, a rhodamine B lake pigment, carbon blacks, etc., and as an inorganic pigment, there can be provided iron oxides, titanium oxides, calcium carbonate, barium sulfate, aluminum hydroxide, barium yellow, iron blue, cadmium red, chrome yellow, metal powders, etc.

Specifically, the following pigments are provided for each color.

As examples of a pigment which can be used for yellow ink, there can be provided, for example, C.I. pigment yellow 1, C.I. pigment yellow 2, C.I. pigment yellow 3, C.I. pigment yellow 12, C.I. pigment yellow 13, C.I. pigment yellow 14, C.I. pigment yellow 16, C.I. pigment yellow 17, C.I. pigment yellow 73, C.I. pigment yellow 74, C.I. pigment yellow 75, C.I. pigment yellow 83, C.I. pigment yellow 93, C.I. pigment yellow 95, C.I. pigment yellow 97, C.I. pigment yellow 98, C.I. pigment yellow 114, C.I. pigment yellow 128, C.I. pigment yellow 129, C.I. pigment yellow 151, C.I. pigment yellow 154, etc., but it is not limited to them.

As examples of a pigment which can be used for magenta ink, there can be provided, for example, C.I. pigment red 5, C.I. pigment red 7, C.I. pigment red 12, C.I. pigment red 48 (Ca), C.I. pigment red 48 (Mn), C.I. pigment red 57 (Ca), C.I. pigment red 57:1, C.I. pigment red 112, C.I. pigment red 123, C.I. pigment red 168, C.I. pigment red 184, C.I. pigment red 202, etc., but it is not limited to them.

As examples of a pigment which can be used for cyan ink, there can be provided, for example, C.I. pigment blue 1, C.I. pigment blue 2, C.I. pigment blue 3, C.I. pigment blue 15:3, C.I. pigment blue 15:34, C.I. pigment blue 16, C.I. pigment blue 22, C.I. pigment blue 60, C.I. vat blue 4, C.I. vat blue 60, etc., but it is not limited to them.

Also, for a pigment contained in each ink used in the present invention, a newly manufactured pigment for the present invention can be used.

The pigments provided above can be dispersed in an aqueous medium by using a polymer dispersing agent or surfactant so as to provide a recording liquid for ink jet. As a dispersing agent for dispersing ouch organic pigment powder, a normal water-soluble resin or water-soluble surfactant can be used.

As specific examples of a water-soluble resin, there can be provided block copolymers or random copolymers obtained from at least two monomers selected from styrene, styrene derivatives, vinylnaphthalene derivatives, aliphatic alcohol esters of $\alpha,\beta$-ethylenic unsaturated carboxylic acid, acrylic acid, acrylic acid derivatives, maleic acid, maleic acid derivatives, itaconic acid, itaconic acid derivatives, fumaric acid, fumaric acid derivatives, etc.; or salts thereof, etc.

These water-soluble resins are alkali-soluble-type resins which are soluble in an aqueous solution in which a base is dissolved, and among these, ones having a weigh-average molecular weight of 3,000-20,000 are particularly preferable since they have an advantage such that the viscosity of a dispersion liquid can be lowered or the dispersion is easy in the case of use for recording liquid for ink jet.

Use of the combination of a polymer dispersing agent and a self-dispersion-type pigment is preferable since a moderate dot diameter can be obtained. The reason thereof is not necessarily clear but can be considered as follows.

The permeation into a recording paper is suppressed by containing a polymer dispersing agent. On the other hand, since the aggregation of a self-dispersion-type pigment is suppressed by containing a polymer dispersing agent, the elf-dispersion-type pigment smoothly spreads in lateral directions. Thus, it is considered that a dot spreads widely or thinly so as to form an ideal dot.

Also, as specific examples of a water-soluble surfactant which can be used as a dispersing agent, the following surfactants can be provided. For example, as an anionic surfactant, there can be provided salts of higher fatty acids, alkylsulfates (salts), alkylethersulfates (salts), alkylestersulfates (salts), alkylarylethersulfates (salts), alkylsulfonates (salts), sulfosuccinates (salts), alkylallylsulfonates (salts) and alkylnapthalenesulfonates (salts), alkylphosphonates (salts), polyoxyethylenealkyletherphosphonates (ester salts), alkylallyletherphosphonates (salts), etc. Also, as a cationic surfactant, there can be provided alkylamine salts, dialkylamine salts, tetraalkylammonium salts, benzalkonium salts, alkylpyridinium salts, imidazolinium salts, etc.

Further, as an amphoteric surfactant, there can be provided dimethylalkyllaurylbetaines, alkylglycines, alkyldi(aminoethyl)glycines, imidazoliniumbetaine, etc. Also, as a nonionic surfactant, there can be provided polyoxyethylene alkyl ethers, polyoxyethylene alkylallyl ethers, polyoxyethylene polyoxypropylene glycol, glycerine esters, sorbitan esters, sucrose esters, polyoxyethylene ethers of glycerine esters, polyoxyethylne ethers of, sorbitan esters, polyoxyethylne ethers of sorbitol esters, amides of fatty acids and alkanols, polyoxyethylene fatty amides, amine oxides, polyoxyethylene alkylamines, etc.

Also, the pigment can be coated and microcapsulated with a rein having a hydrophilic group so as to provide a dispersion property.

As a method for coating and microcapsulating a water-insoluble pigment with an organic polymer, all the conventionally known methods can be used. As a conventionally known method, there can be provided chemical manufacturing methods, physically manufacturing methods, physically chemical methods, mechanical manufacturing methods, etc. Specifically, there can be provided an interfacial polymerization method, an in-situ polymerization method, a submerged cured coating method, a coacervation (phase separation) method, a submerged drying method, a melting-dispersion-cooling method, an aerial suspension coating method, a spray-drying method, an acid precipitation method, a phase inversion emulsification method, etc.

The interfacial polymerization method is a method such that two kinds of monomers or two kinds of reactants are separately dissolved in a dispersion phase and a continuous phase and both substances are reacted on the interface thereof so as to form a wall film. The in-situ polymerization method is a method such that a liquid or gaseous monomer and a catalyst or two kinds of reactive substances are provided from either of the sides of a continuous phase and nuclear particles so as to cause reaction and to form a wall film. The submerged cured coating method is a method such that drops of a polymer solution containing particles of a core material is insolubilized by a curing agent, etc., in liquid so as to form a wall film.

The coacervation (phase separation) method is a method such that a polymer dispersion liquid in which particles of a core material are dispersed is separated into a coacervate (concentrated phase) with a high polymer concentration and a diluted phase so as to form a wall film. The submerged drying method is a method such that a liquid in which a core material is dispersed in a solution of a wall film material is prepared, the dispersion liquid is added into a liquid which is not miscible with a continuous phase of the dispersion liquid so as to obtain a complex emulsions and a medium dissolving the water film material is gradually removed so as to form a wall film.

The malting-dispersion-cooling method is a method such that a wall film material which is melted into liquid by heating and solidified at ordinary temperature is heated and liquefied, particles of a core material are dispersed therein, they are made be fine particles, and cooling is performed to form a wall film. The aerial suspension coating method is a method such that particles of a core material are suspended as powder in gas by a fluidized bed and floated in gas stream while a coating liquid of a wall film material is sprayed and mixed therein so as to form a wall film.

The spray-drying method is a method such that a stock solution for capsulation is sprayed and contacted with hot wind so as to evaporate and dry a volatile component whereby a wall film is formed. The acid precipitation method is a method such that at least one of anionic groups of an organic polymeric compound containing the anionic groups is neutralized with a basic compound so as to provide the solubility to water, kneading is made with a coloring material in an aqueous medium, subsequently, neutralization or acidification is made with an acidic compound so as to precipitate organic compounds and fix them on the coloring material, and finally, neutralization and dispersion are made. The phase inversion emulsification method is a method such that while a mixture containing an anionic organic polymer having dispersibility in water and a coloring material is provided as a organic solvent phase, water is thrown into the organic solvent phase or the organic solvent phase is thrown into water.

As organic polymers (resins) used for a material for providing a wall film of a microcapsule, there can be provided, for example, polyamides, polyurethanes, polyesters, polyureas, epoxy resins, polycarbonates, urea resins, melamine resins, phenol resins, polysaccharides, gelatin, gum Arabic, dextran, casein, proteins, natural rubbers, carboxypoly methylene, polyvinyl alcohol, polyvinyl pyrrolidone, polyvinyl acetate, polyvinyl chloride, polyvinylidene chloride, cellulose, ethylcellulose, methylcellulose, nitrocellulose, hydroxyethylcellulose, cellulose acetate, polyethylene, polystyrene, homopolymers and copolymers of (meth)acrylic acid, homopolymers and copolymers of (meth)acrylates (esters), (meth)acrylic acid-(meth)acrylate (ester) copolymer, styrene-(meth)acrylic acid copolymer, styrene-maleic acid copolymer, sodium alginate, fatty acids, paraffins, beeswax, water wax, hardened beef tallow, carnauba wax, albumin, etc.

Among these, organic polymers having an anionic group such as a carboxyl group or a sulfone group can be used. Also, as a nonionic organic polymer, there can be provided, for example, polyvinyl alcohol, polyethylene glycol monomethacrylate, polypropylene glycol monomethacrylate, methoxypolyethylene glycol monomethacrylate and copolymers thereof, and cationic ring-opening polymers of 2-oxazoline, etc. particularly, polyvinyl alcohol obtained through complete saponification has a low water-solubility and a property such that it is easily dissolved in hot water but is not easily dissolved in cold water, which is particularly preferable.

Also, the quantity of an organic polymer for providing a wall film of a microcapsule is 1% by weight or more and 20% by weight or less of a water-insoluble coloring material such as organic pigments and carbon blacks. As the quantity of the organic polymer is in the range described above, the content of the organic polymer in the capsule is comparatively low and, therefore, the lowering of the coloring property of a pigment which is caused by coating the surface of the pigment with the organic polymer can be suppressed. If the quantity of the organic polymer is less than 1% by weight, it may be difficult to provide the effect of capsulation, and, on the other hand, if it is more than 20% by weight, the coloring property of the pigment may be significantly lowered. Further, as other properties thereof are taken into consideration, the quantity of the organic polymer is preferably in a range of 5-10% by weight of the water-insoluble coloring material.

That is, since a part of the coloring material is not coated but is substantially exposed, the lowering of the coloring property can be suppressed and, on the other hand, a part of the coloring material is not exposed but is substantially coated, the effect of coating the pigment is simultaneously provided. Also, the number-average molecular weight of the organic polymer is preferably 2,000 or greater from the viewpoint of the manufacture of a capsule. Herein, "being substantially exposed" does not mean a partial exposure associated with a defect such as a pinhole and a crack but means the condition of being positively exposed.

Further, when an organic pigment which is a self-dispersive pigment or a self-dispersive carbon black is used as a coloring material, even if the content of the organic polymer in the capsule is comparatively low, the dispersiblity of the pigment can be improved and, therefore, a sufficient storage stability can be obtained, which is more preferable for the present invention.

Additionally, it is preferable to select a suitable organic polymer depending on a method of microcapsulation. For example, for an interfacial polymerization method, polyesters, polyamides, polyurethanes, polyvinyl pyrrolidone, epoxy resins, etc., are suitable. For an in-situ polymerization method, homopolymers and copolymers of (meth)acrylates (esters), (meth)acrylic acid-(meth)acrylate (ester) copolymers, styrene-(meth)acrylic acid copolymers, polyvinyl chloride, polyvinylidene chloride, polyamides, etc., are suitable. For a submerged cured coating method, sodium alginate, polyvinyl alcohol, gelatin, albumin, epoxy resins, etc., are preferable. For a coacervation method, gelatin, celluloses, casein, etc., are suitable. Of course, all the conventionally known capsulation methods in addition to those described above can be also utilized for obtaining a fine and uniform microcapsulated pigment.

When a phase inversion method or an acid precipitation method is selected as a method of microcapsulation, an anionic organic polymer is used as an organic polymer for providing a wall film of a microcapsule. The phase inversion method is a method such that a complex of an anionic organic polymer having self-dispersibility or solubility in water and a coloring material such as a self-dispersive organic pigment or a self-dispersion-type carbon black or a mixture of the anionic organic polymer, a coloring material such as a self-dispersive organic pigment or a self-dispersion-type carbon black, and a curing agent is provided as an organic solvent phase and microcapsulation is conducted while self-dispersion (phase inversion emulsification) is caused by throwing water into the organic solvent phase or throwing the organic solvent phase into water. In the inversion phase method, it is not problematic to mix a vehicle for recording liquid or an additive into the organic solvent phase for the manufacture. Particularly, it is more preferable to mix a liquid medium for recording liquid since a dispersion liquid for recording liquid can be directly manufactured.

On the other hand, the acid precipitation method is a method such that a part of or all anionic groups in water-containing cake obtained by a manufacturing method including a processes of neutralizing a part of or all anionic groups of an organic polymer containing the anionic groups with a basic compound, kneading it with a coloring material such as a self-dispersive organic pigment or a self-dispersion-type carbon black in aqueous medium, and to control the pH to neutral or acidic using an acidic compound to precipitate and fix the anionic group-containing organic polymer on the pigment, is neutralized using a basic compound, thereby conducting the microcapsulation. Thus, an aqueous dispersion liquid containing a fine anionic microcapsulated pigment containing much pigment can be manufactured.

Also, as a solvent used in the microcapsulation as described above, there can be provided, for example, alkylalcohols such as methanol, ethanol, propanol and butanol; aromatic hydrocarbons such as benzole, toluole and xylole; eaters such as methyl acetate, ethyl acetate and butyl acetate chlorinated hydrocarbons such as chloroform and ethylene dichloride; ketones such as acetone and isobutyl methyl ketone; ethers such as tetrahydrofuran and dioxane, cellosolves such as methylcellosolve and butylcellosolve, etc. Also, the microcapsules prepared by the method described above is once separated from the solvent by means of centrifugal separation, filtration, or the like and stirred and re-dispersed in water and necessary solvent so as to an objective recording liquid which can be used for the present invention. The average particle diameter of the capsulated pigment obtained by a method as described above is preferably 50 nm-180 nm.

The pigment adheres to an object to be printed due to such resin coating so that the rubbing resistance of the object to be printed can be improved.

[Dye]

As a dye used for recording liquid, dyes classified in acidic dyes, direct dyes, basic dyes, reactive dyes and food colors in color indices and having excellent water resistance and light fastness are used. Plural kinds of these dyes may be mixed and used or, if necessary, may be mixed and used with another color material such as a pigment. Such a coloring agent is added in a range such that the effect of the present invention is not inhibited.

(a) As acidic dyes and food colors,

C.I. acid yellows 17, 23, 42, 44, 79, and 142,

C.I. acid reds 1, 8, 13, 14, 18, 26, 27, 35, 37, 42, 52, 82, 87, 89, 92, 97, 106, 111, 114, 115, 134, 186, 249, 254, and 289, C.I. acid blues 9, 29, 45, 92, and 249, C.I. acid blacks 1, 2, 7, 24, 26, and 94, C.I. food yellows 3 and 4, C.I. food reds 7, 9, and 14, and C.I. food blacks 1 and 2, etc., can be used.

(b) As direct dyes,

C.I. direct yellows 1, 12, 24, 26, 33, 44, 50, 86, 120, 132, 142, and 144,

C.I. direct reds 1, 4, 9, 13, 17, 20, 28, 31, 39, 80, 81, 83, 89, 225, and 227,

C.I. direct oranges 26, 29, 62, and 102,

C.I. direct blues 1, 2, 6, 15, 22, 25, 71, 76, 79, 86, 87, 90, 98, 163, 165, 199, and 202, and C.I. direct blacks 19, 22, 32, 38, 51, 56, 71, 74, 75, 77, 154, 168, and 171, etc., can be used.

(C) As basic dyes,

C.I. basic yellows 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. basic reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112, C.I. basic blues 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. basic blacks 2 and 8, etc., can be used.

(d) As reactive dyes,

C.I. reactive blacks 3, 4, 7, 11, 12, and 17,

C.I. reactive yellows 1, 5, 11, 13, 14, 20, 21, 22, 25, 40, 47, 51, 55, 65, and 67, C.I. reactive reds 1, 14, 17, 25, 26, 32, 37, 44, 46, 55, 60, 66, 74, 79, 96, and 97, and C.I. reactive blues 1, 2, 7, 14, 15, 23, 32, 35, 38, 41, 63, 80, and 95, etc., can be used.

[Additives and Physical Properties Common to Pigments and Dyes]

It is preferable to use a water-soluble organic solvent as well as a coloring material for the purposes of providing recording liquid used for an image forming apparatus according to the present invention with a desired physical property or preventing clogging in a nozzle of a recording head which is caused by the drying of the recording liquid. The water-soluble organic solvent may include a wetting agent or a penetrating agent. The wetting agent is added for the purpose of preventing clogging in a nozzle of a recording head which is caused by the drying of the recording liquid.

Specific examples of the wetting agents are polyhydric alcohols such as ethylene glycol, diethylene glycol, triethylene glycol, tetraethylene glycol, polyethylene glycol, propylene glycol, 1,3-butanediol, 1,3-propanediol, 2-methyl-1,3-propanediol, 1,4-butanediol, 1,5-pentanediol, 1,6-hexanediol, glycerin, 1,2,6-hexanetriol, 2-ethyl-1,3-hexanediol, 1,2,4-butanetriol, 1,2,3-butanetriol, and petriols; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone, and δ-caprolactam; amides such as formamide, N-methylformamide, and N,N-dimethylformamide; amines such as monoethanolamine, diethanolamine, triethanolamine, monoethylamine, diethylamine, and triethylamine; sulfur-containing compounds such as dimethyl sulfoxide, sulfolane, and thiodiethanol; propylene carbonate, ethylene carbonate, and γ-butyrolactone. These solvents are used singularly or in combination with water.

Also, the penetrating agent is added for the purpose of improving the wettability of a material to be recorded with recording liquid and adjusting the penetration speed thereof. As a penetrating agent, penetrating agents represented by the following formulas (I)-(IV) are preferable. That is, since a polyoxyethylene alkylphenyl ether-type surfactant of the following formula (I), a acetylene glycol-type surfactant of the following formula (II), a polyoxyethylene alkyl ether-type surfactant of the following formula (III) and polyoxyethylene polyoxypropylene alkyl ether-type surfactant of the following formula (IV) can lower the surface tension of liquid, the wettability can be improved and the penetration speed can be increased.

(I)

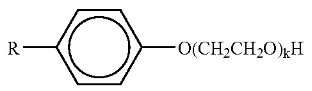

(R is a hydrocarbon chain with 6-14 carbon atoms which may be branched and k is 5-20.)

(II)

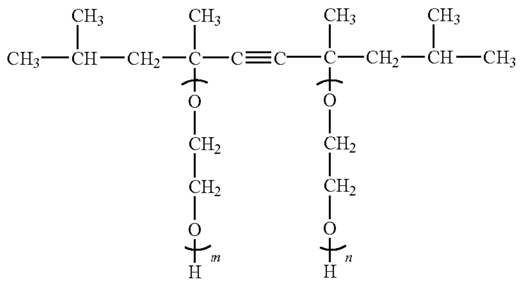

(Each of m and n is 0-40.)

$R—(OCH_2CH_2)_nH$ (III)

(R is a hydrocarbon chain with 6-14 carbon atoms which may be branched and k is 5-20.)

(IV)

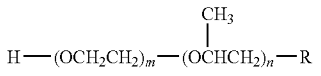

(R is a hydrocarbon chain with 6-14 carbon atoms and each of m and n is a number equal to or less than 20.)

In addition to the compounds of the formulas (I)-(IV), there can be used, for example, polyhydric alcohol alkyl or aryl ethers such as diethylene glycol monophenyl ether, ethylene glycol monophenyl ether, ethylene glycol monoallyl ether, diethylene glycol monobutyl other, propylene glycol monobutyl ether, and tetraethylene glycol chlorophenyl ether; nonionic surfactants such as a polyoxyethylene polyoxypropylene block copolymer, fluorine-containing surfactants, and lower alcohols such as ethanol and 2-propanol, and diethylene glycol monobutyl ether is particularly preferable.

The surface tension of recording liquid used for an image forming apparatus according to the present invention is preferably 10-60 N/m, and more preferably, 15-30 N/m from the viewpoint of the balance between the wettability of a medium to be recorded and particle formation for a liquid drop.

Similarly, the viscosity of recording liquid is preferably in a range of 1.0-20 mPa·s and preferably in a range of 5.0-10 mPa·s from the viewpoint of ejection stability.

Also, the pH of recording liquid is preferably in a range of 3-11 and, more preferably, the pH is in a range of 6-10 from the viewpoint of preventing the corrosion of a metal member which may contact the liquid.

Further, the recording liquid can contain an antiseptic and mildewproofing agent. The proliferation of a fungus can be suppressed by containing the antiseptic and mildewproofing agent, whereby the storage stability and image stability can be enhanced. As an antiseptic and mildewproofing agent, there can be used benzotriazole, sodium dehydroacetate, sodium sorbate, sodium 2-pyridinethiol-1-oxide, isothiazoline-based compounds, sodium benzoate, sodium pentachlorophenolate, etc.

Also, the recording liquid can contain a rust inhibitor. A coating film is formed on a metal surface of the head, etc., which surface may contact the liquid, by containing the rust inhibitor, so that the corrosion can be prevented. As a rust inhibitor, there can be used, for example, acidic sulfites (salts), sodium thiosulfate, antimony thiodiglycolate, diisopropylammonium nitrite, pentaerythrytol tetranitrate, dicyclohexylammonium nitrite, etc.

Further, the recording liquid can contain an anti-oxidizing agent. As the anti-oxidizing agent is contained, even when radical species causing the corrosion generate, the anti-oxidizing agent quenches the radical species so that the corrosion can be prevented.

As an anti-oxidizing agent, phenol-type compounds and amine-type compounds are representative, wherein, as a phenol-type compound, there can be provided, for example, compounds such as hydroquinone and gallate; and hindered phenol-type compounds such as 2,6-di-tert-butyl-p-cresol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 1,1,3-tris(2-methyl-4-hydroxy-5-tert-butylphenyl)butane, 1,3,5-trimethyl-2,4,6-tris(3,5-di-tert-4-hydroxybenzyl)benzene, tris(3,5-di-tert-butyl-4-hydroxybenzyl)isocyanurate, tetrakis[methylene-3(3',5'-di-tert-butyl-4-hydroxyphenyl)propionate]methane, and as an amine-type compounds, there can be provided, for example, N,N'-diphenyl-p-phenylenediamine, phenyl-β-naphthylamine, phenyl-α-naphthylamine, N,N'-β-naphthyl-p-phenylenediamine, N,N'-diphenylethylenediamine, phenothiazine, N,N'-di-sec-butyl-p-phenylenediamine, 4,4'-tetramethyl-diaminodiphenylmethane, etc. Also, as an anti-oxidizing agent, sulfur-containing compounds and phosphorus-containing compounds are representative, wherein as a sulfur-containing compound, there can be provided, for example, dilauryl thiodipropionate, distearyl thiodipropionate, lauryl stearyl thiodipropionate, dimyristyl thiodipropionate, distearyl β,β'-thiodibutyrate, 2-mercaptobenzoimidazole, dilaurylsulfide, etc., and as a phosphorus-containing compound, there can be provided, for example, triphenylphosphite, trioctadecylphosphite, tridecylphosphite, trilauryltrithiophosphite, diphenylisodecylphosphite, trinonylphenylphosphite, distearylpentaerythrytolphosphite, etc.

Also, the recording liquid can contain a pH adjusting agent. As a pH adjusting agent, there can be used alkali metal hydroxides such as lithium hydroxide, sodium hydroxide, and potassium hydroxide; ammonium hydroxide; quaternary ammonium hydroxides; quaternary phosphonium hydroxides; alkali metal carbonates such as lithium carbonate, sodium carbonate, and potassium carbonate; amines such as diethanolamine and triethanolamine; boric acid; hydrochloric acid; nitric acid; sulfuric acid; acetic acid, etc.

Figure 6:
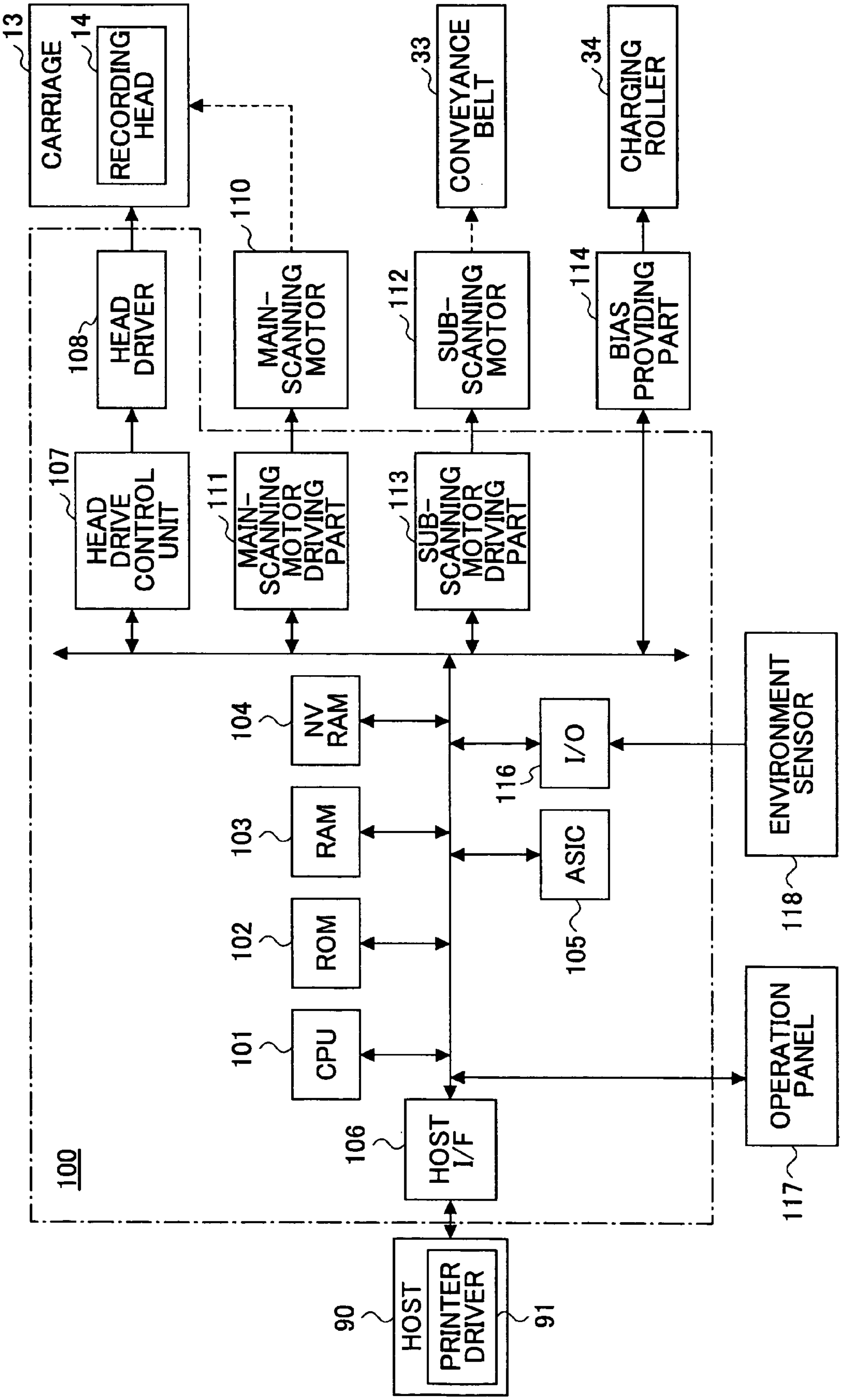
FIG. 6 is a block diagram for schematically showing a control part of the apparatus.

Next, a control part of the image forming apparatus is generally described with reference to FIG. 6. Herein, the figure is an overall block diagram for illustrating the control part.

The control part 100 includes a CPU 101 for controlling the entire of the apparatus, a ROM 102 for storing a program executed by the CPU 101 and other foxed data, a RAM 103 for temporarily storing image data, etc., a nonvolatile memory (NVRAM) 104 for holding data even when a power supply for the apparatus is turned off, and an ASIC 105 for conducting each kind of signal processing, image processing for conducting sorting, etc., (which may include a part of image processing described below), and input or output signal processing for controlling the entire of the apparatus.

Also, the control part 100 includes an I/F 106 for transmitting and receiving data or signal with a host 90 such as a personal computer (which may be denoted by "PC", below) including an image forming apparatus according to the present invention, a head driving control part 107 and a head driver 108 for driving and controlling a recording head 14, a main-scanning motor driving part 111 for driving a main-scanning motor 110, a sub-scanning motor driving part 113 for driving a sub-scanning motor 112, an environment sensor 118 for detecting environment temperature and/or environment humidity, an I/O 116 through which a detected signal from each kind of sensor which is not shown in the figure is inputted, etc.

Also, the control part 100 is connected to an operation panel 117 for performing input and display of information required for the apparatus. Further, the control part 100 conducts the control of switching on/off and output polarity switching of a high voltage circuit (AC bias providing part 114) for applying a high voltage to a charging roller 34.

Herein, the I/F 106 of the control part 100 receives through a cable or network printing data containing image data from the host 90 which may be a data processing device such as a personal computer, an image reading device such as an image scanner, an imaging device such as a digital camera, or the like. Additionally, the generation and output of printing data for the control part 100 are conducted by a printer driver 91 according to the present invention in the host 90.

Then, the CPU 101 reads out and analyzes the printing data in a signal receiving buffer included in the I/F 106 and the ASIC 105 conducts a sorting process for the data, etc., (which may include a part of image processing described below) and transfers the image date to the head driving control part 107. Additionally, in regard to the conversion of the printing data to bitmap data for image output, the image data are developed to bitmap data by the printer driver 91 in the host 90, as described above, and transferred to the apparatus, but, for example, font data may be stored in the ROM 102.

When the head driving control part 107 receives image data (dot pattern data) corresponding to one line for the recording head 14, the dot pattern data for one line are sent out to the head driver 108 as serial data synchronized with a clock signal and a latch signal is sent out to the head driver 108 at a predetermined timing.

The head driving control part 107 includes a ROM (which may be the ROM 102) in which pattern data of driving waveform (driving signal) are stored, and a driving waveform generating circuit composed of a waveform generating circuit including an D/A converter for D/A converting the data of driving waveform read out from the ROM, an amplifier, etc.

Also, the head driver 108 includes a shift register for inputting the clock signal and the serial data being the image data from the head driving control part 107, a latch circuit for latching a registered value in the shift register using the latch signal from the head driving control part 107, a level conversion circuit (level shifter) for level-changing an output value from the latch circuit, an analog switch array (switching device) which is on/off-controlled by the level shifter, etc. The required driving waveform contained in the driving waveform is applied to an actuator for the recording head 14 by controlling on/off of the analog switch array, thereby driving the head.

Next, examples of an image processing device (data processing device) according to the present invention which have configurations different from each other and include a printer driver being a program according to the present invention in a host for transferring image data for forming an image in the image forming apparatus are described with reference to FIGS. 7A and 7B and FIGS. 8A and 8B. Additionally, an image forming system according to the present invention may be composed of the image processing device and the image forming apparatus described above.

Figure 7A:
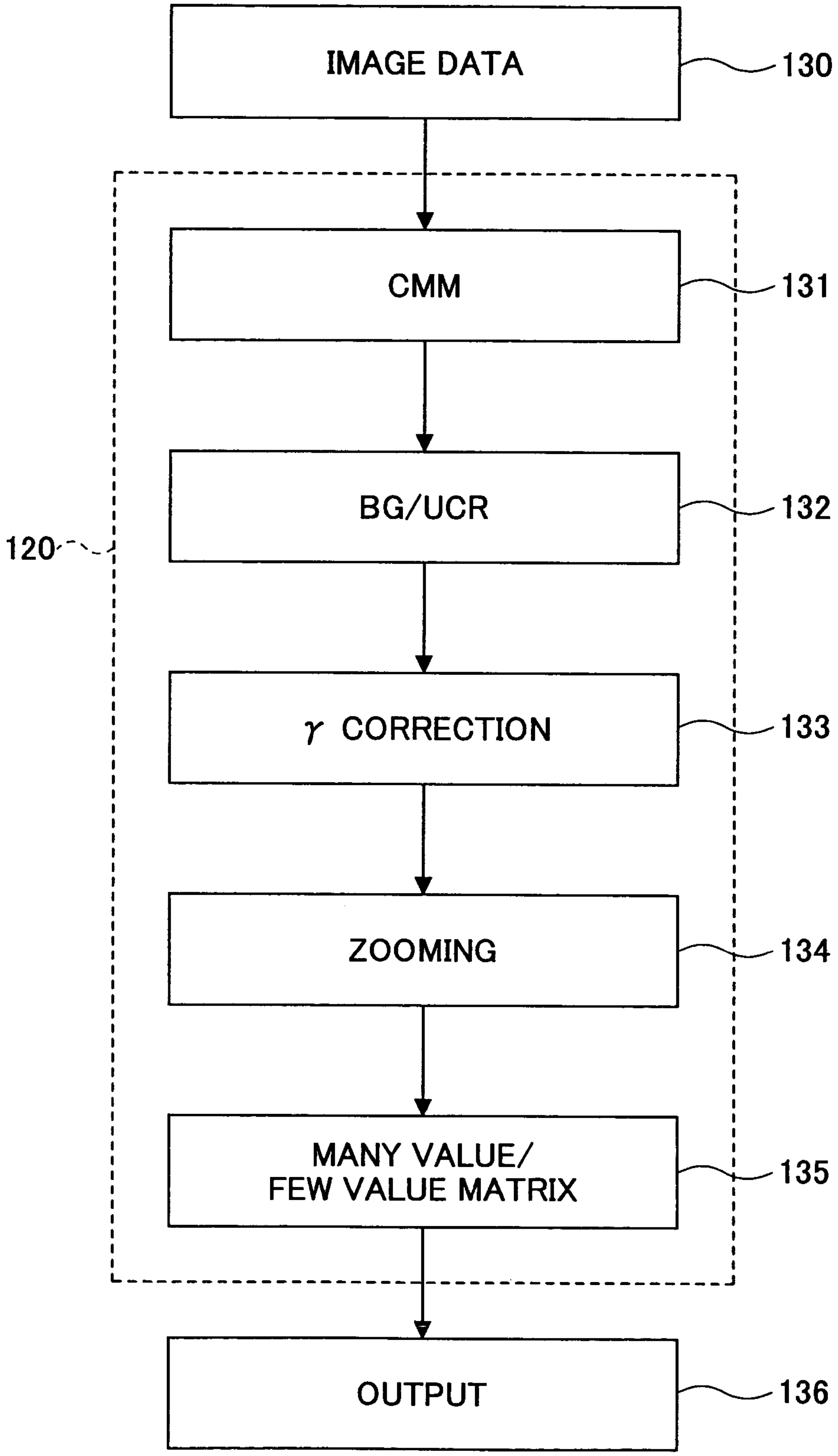
FIG. 7A is a block diagram for functionally illustrating one example of the structure of a printer driver according to the present invention in an image processing device according to the present invention.

First, in an example shown in FIG. 7A, printer driver 120 in the host includes a CMM (Color Management Module) processing part 131 which is a color space transformation processing part according to the present invention for transforming color space for monitor display to color space for recording device (from an RGB color system to an CMY color system) in regard to the image data 130 provided from an application software, etc., a BG/UCR (Black Generation/Under Color Removal) processing part 132 for conducting black generation and under color removal from CMY values, a γ-correction part 133 for conducting input or output correction on which the characteristic of the recording device and preference of a user are reflected, a zooming part 134 for conducting a magnification process depending on the resolution of the recording device, and a half-tone processing part 135 including a many value/few value matrix for replacing the image data by the pattern of dots jetted from the recording device, with the processed data being output 136.

Figure 8A:
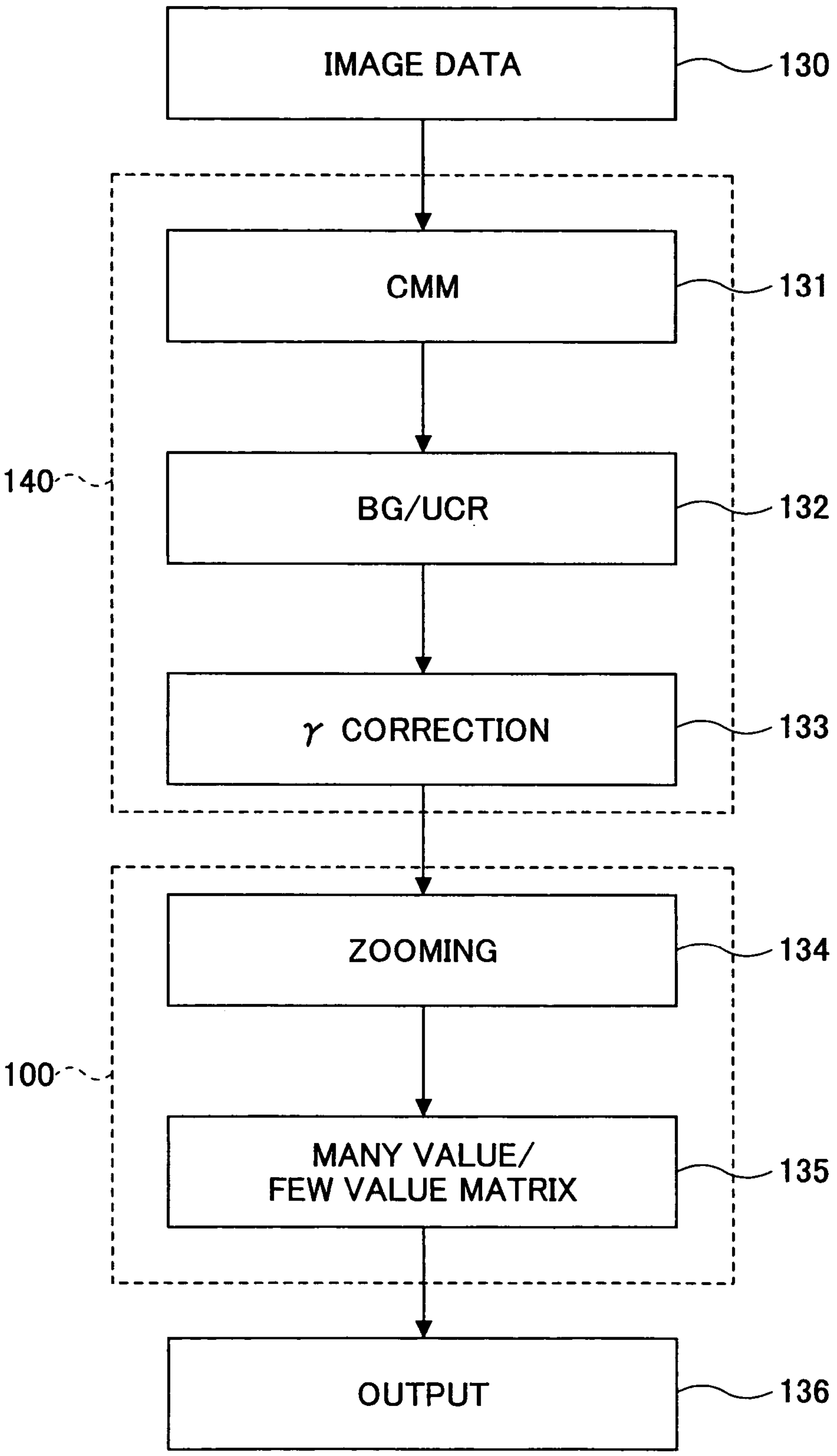
FIG. 8A is a block diagram for functionally illustrating another example of the structure of a printer driver according to the present invention.

Also, in an example shown in FIG. 8A, printer driver 140 in the host includes a CMM (Color Management Module) processing part 131 for transforming color space for monitor display to color space for recording device (from an RGB color system to an CMY color system) in regard to the image data 130 provided from an application software, etc., a BG/UCR (Black Generation/Under Color Removal) processing part 132 for conducting black generation and under color removal from CMY values, and a γ-correction part 133 for conducting input or output correction on which the characteristic of the recording device and preference of a user are reflected.

Then, in the case of the configuration shown in FIG. 8A, the control part 100 of the image forming apparatus includes a zooming part 134 configured to receive output data after the γ-correction process is conducted and apply a magnification process depending on the resolution of the recording device to the data, and a half-tone processing part 135 including a many value/few value matrix for replacing the image data by the pattern of dots jetted from the recording device, with the processed data being output 136.

Figure 7B:
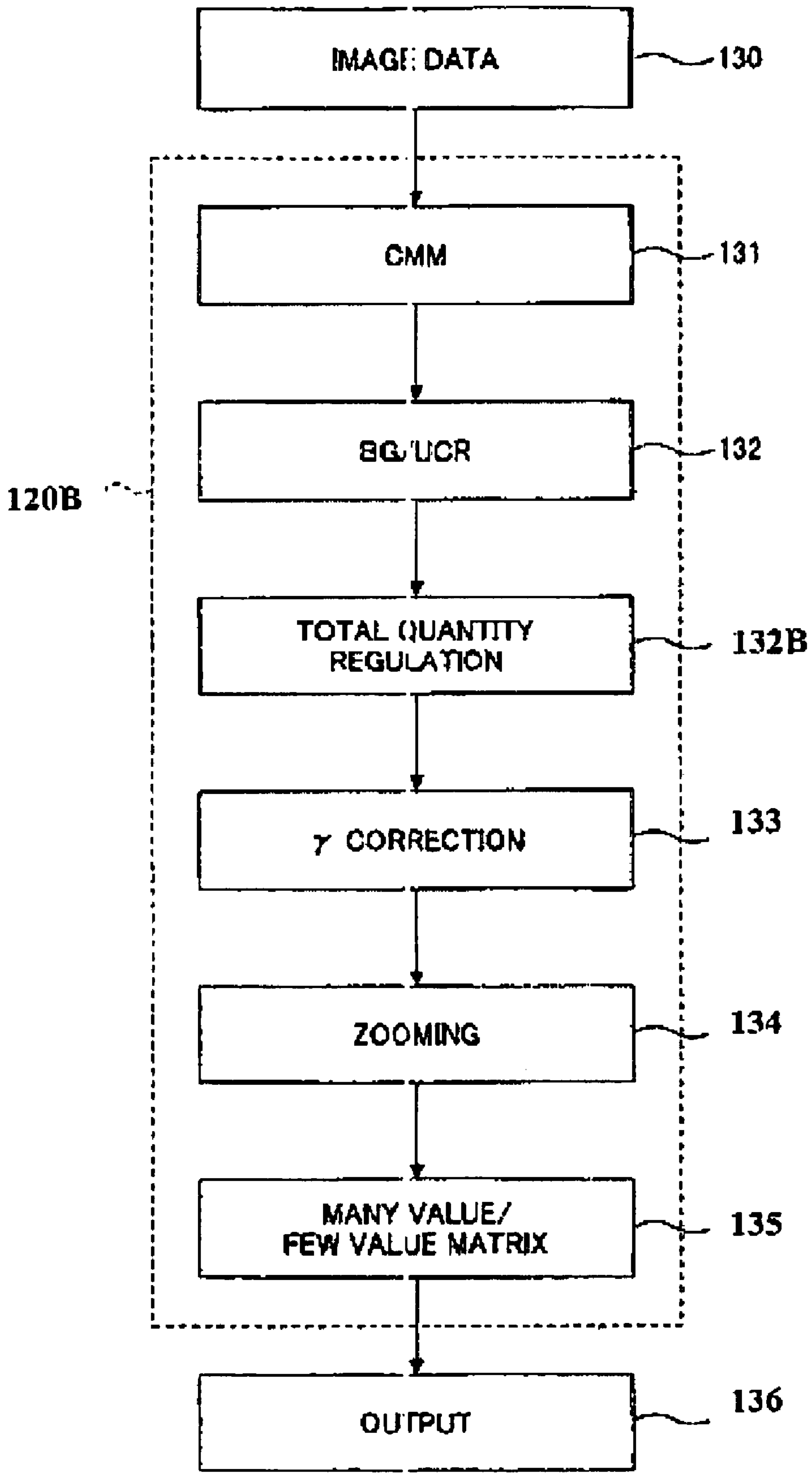
FIG. 7B is a block diagram for functionally illustrating one example of the structure of a printer driver according to the present invention in an image processing device according to the present invention.

Next, in an example shown in FIG. 7B, printer driver 120B in the host includes a CMM (Color Management Module) processing part 131 for transforming color space for monitor display to color space for recording device (from an RGB color system to an CMY color system) in regard to the image data 130 provided from an application software, etc., a BG/UCR (Black Generation/Under Color Removal) processing part 132 for conducting black generation and under color removal from CMY values and transforming it to KCMY values in which a black (K) component is added, a total quantity regulating part 132B for correcting a CMYK signal which is a recording control signal depending on the maximum value of total quantity of a recording color material on which the image forming apparatus forms an image, a γ-correction part 133 for conducting input or output correction on which the characteristic of the recording device and preference of a user are reflected, a zooming part 134 for conducting a magnification process depending on the resolution of the recording device, and a half-tone processing part 135 including a many value/few value matrix for replacing the image data by the pattern of dots jetted from the recording device, with the processed data being output 136.

Figure 8B:
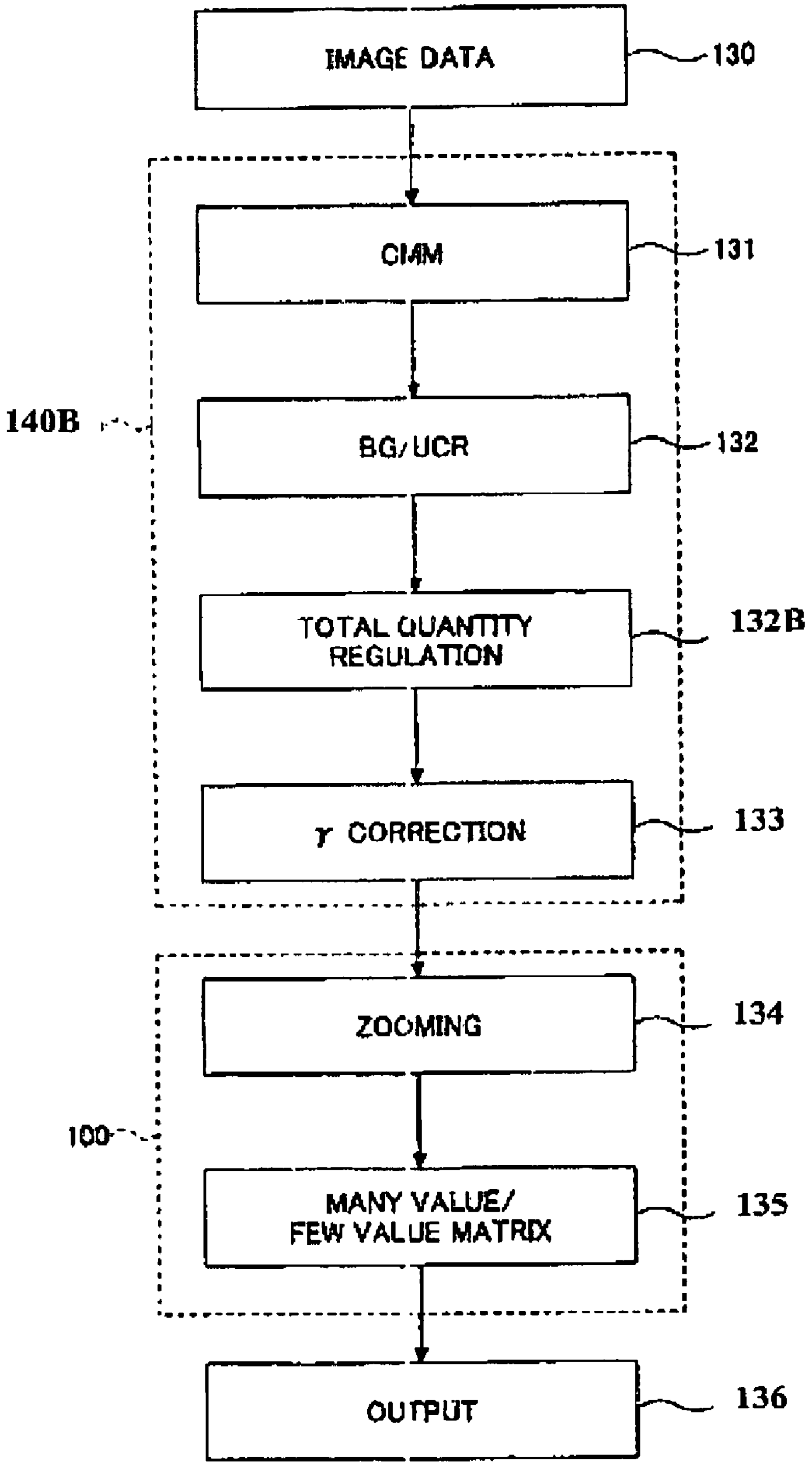
FIG. 8B is a block diagram for functionally illustrating another example of the structure of a printer driver according to the present invention.

Also, in an example shown in FIG. 8B, printer driver 140B in the host includes a CMM (Color Management Module) processing part 131 for transforming color space for monitor display to color space for recording device (from an RGB color system to an CMY color system) in regard to the image data 130 provided from an application software, etc., a BG/UCR (Black Generation/Under Color Removal) processing part 132 for conducting black generation and under color removal from CMY values, a total quantity regulating part 132B for conducting total quantity regulation, and a γ-correction part 133 for conducting input or output correction on which the characteristic of the recording device and preference of a user are reflected.

Then, in the case of the configuration shown in FIG. 8B, the control part 100 of the image forming apparatus includes a zooming part 134 for receiving output data after the γ-correction process is conducted and applying a magnification process depending on the resolution of the recording device to the data, and a half-tone processing part 135 including a many value/few value matrix for replacing the image data by the pattern of dots jetted from the recording device, with the processed data being output 136.

Additionally, a so-called "low-priced machine" for conducting all of image processing on a PC is shown in FIGS. 7A and 7B, and a so-called "high-speed machine" in which a part of the processes is shared by the ASIC built in the image forming apparatus is shown in FIGS. 8A and 8B. In the configuration examples shown in FIGS. 8A and 8B, since image processes are shared and conducted by the host and the image forming apparatus, not only a time period required for image processing can be reduced but also the deallocation of the host PC can be speeded up. However, since it is necessary to mount a higher performance ASIC (if necessary, and also a large memory), the set price of it commonly tends to be higher than the "low-priced machine".

Figure 9:
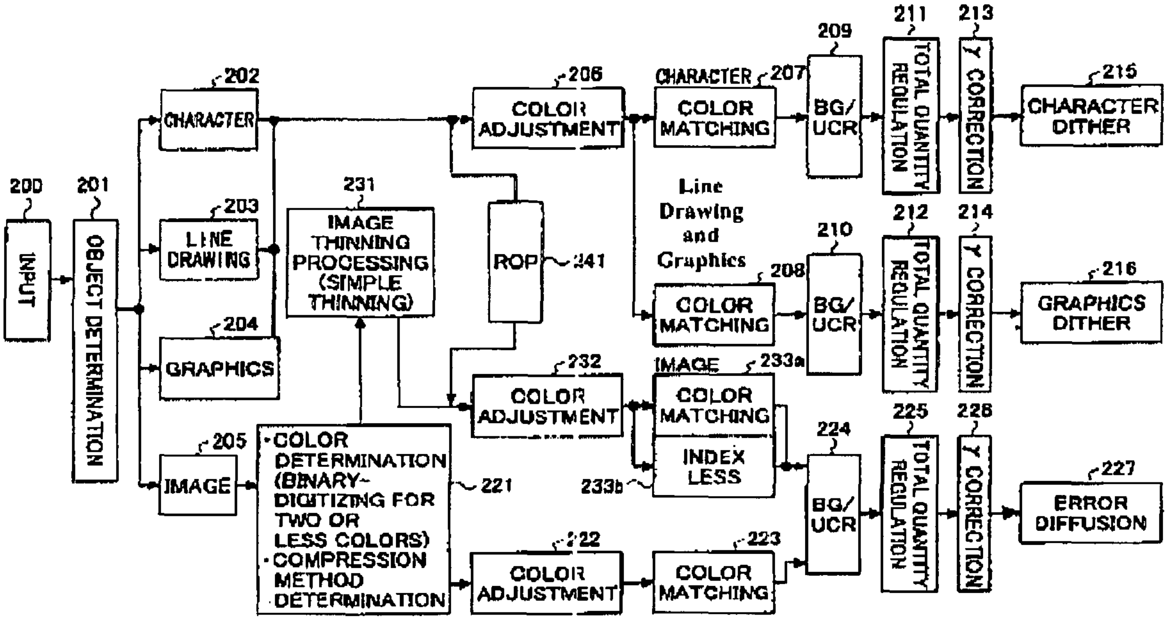
FIG. 9 is a illustrative block diagram for illustrating the details of a flow of image processing in the printer driver.

Next, a flow of image processing by the printer driver 91 in the host is described with reference to a block diagram shown in FIG. 9.

As an instruction of "printing" is provided from an application software operating on a data processing device such as a personal computer, an object determination process 201 determines the kind of an object for input 200 and data for each object, that is, each of image data of character 202, image data of line image 203, image data of graphics 204, and image data 205 of image are provided and processed through each route in the printer driver 91.

That is, a color adjustment process is conducted for a character 202, a line image 203 and graphics 204, a color matching process 207, a BG/UCR process 209, a total quantity regulating process 211, and a γ-correction process 213, and further a character dither process (a half-tone process) 215 are conducted for the character. Also, a color matching process 208, a BG/UCR process 210, a total quantity regulating process 212, and a γ-correction process 214, and further a character dither process (a half-tone process) 216 are conducted for the line image and the graphics.

On the other hand, for the image 205, after a color determination and compression method determination process 221 is conducted and, in the normal case, a color adjustment process 222 and a color matching process 223 are conducted, a BG/UCR process 224. a total quantity regulating process 225 and a γ-correction process 226 are conducted and, further, an error diffusion process (a half-tone process) 227 is conducted. Also, in the case of two or less colors, after an image thinning process 231, a color adjustment process 232, and a color matching process 233*a* or an index-less process (a process which conducts no color-matching) 233*b* are conducted, a BG/UCR process 224, a total quantity regulating process 225 and a γ-correction process 226 are conducted and, further, an error diffusion process (a half-tone process) 227 is conducted.

Additionally, for the line image and the graphics, before the color adjustment process 206 is conducted, branching and transfer to the color matching process 232 for an image through a ROP process 241 may be conducted.

Thus, the image data processed for each object is synthesized into one-image data again, which is provided to the image forming apparatus.

One embodiment of an image processing method according to the present invention relates to a "CMM process" for transforming color space for monitor display to color space for an image forming apparatus (from an RGB color system to an CMY color system) in regard to input data, which is conducted in a color matching process.

Figure 10A:
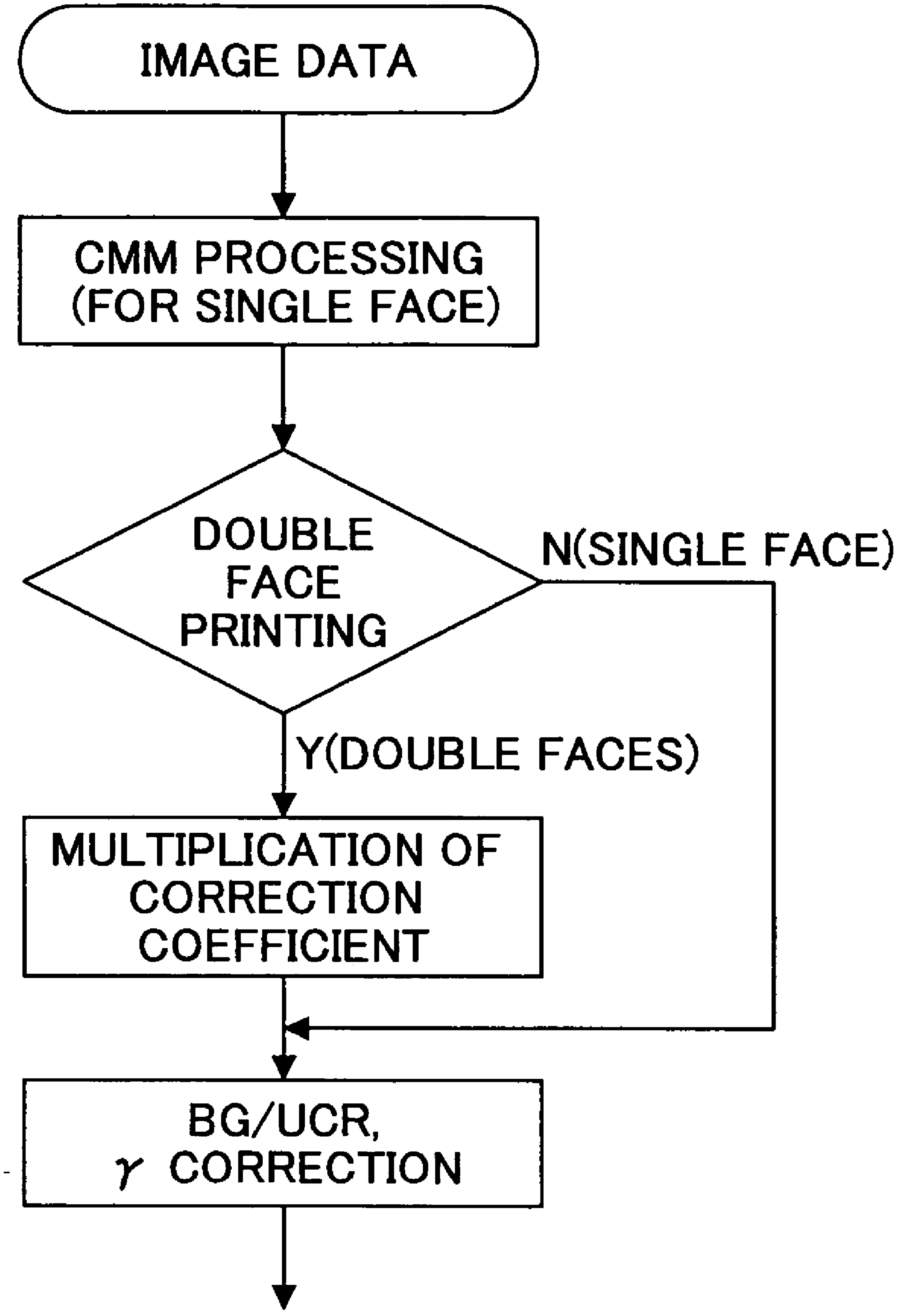
FIG. 10A is a flow diagram provided for illustrating a color space transformation process according to one embodiment of the present invention.

In one embodiment of the present invention, as shown in FIG. 10A, a CMM process is conducted using a color space processing transformation table (for a single face) as a basis, and whether double face printing or single face printing is determined, wherein, in the case of double face printing, values obtained by the CMM process are multiplied by a correction coefficient and the multiplied values are regarded as CMM values, and in the case of single face printing, values obtained by the CMM process remain as CMM values and transferred to the subsequent BG/UCR process. In this example, the combination process of the normal CMM process for single face and the correction coefficient multiply process corresponds to "color space transformation process" in the present invention.

Figure 11:
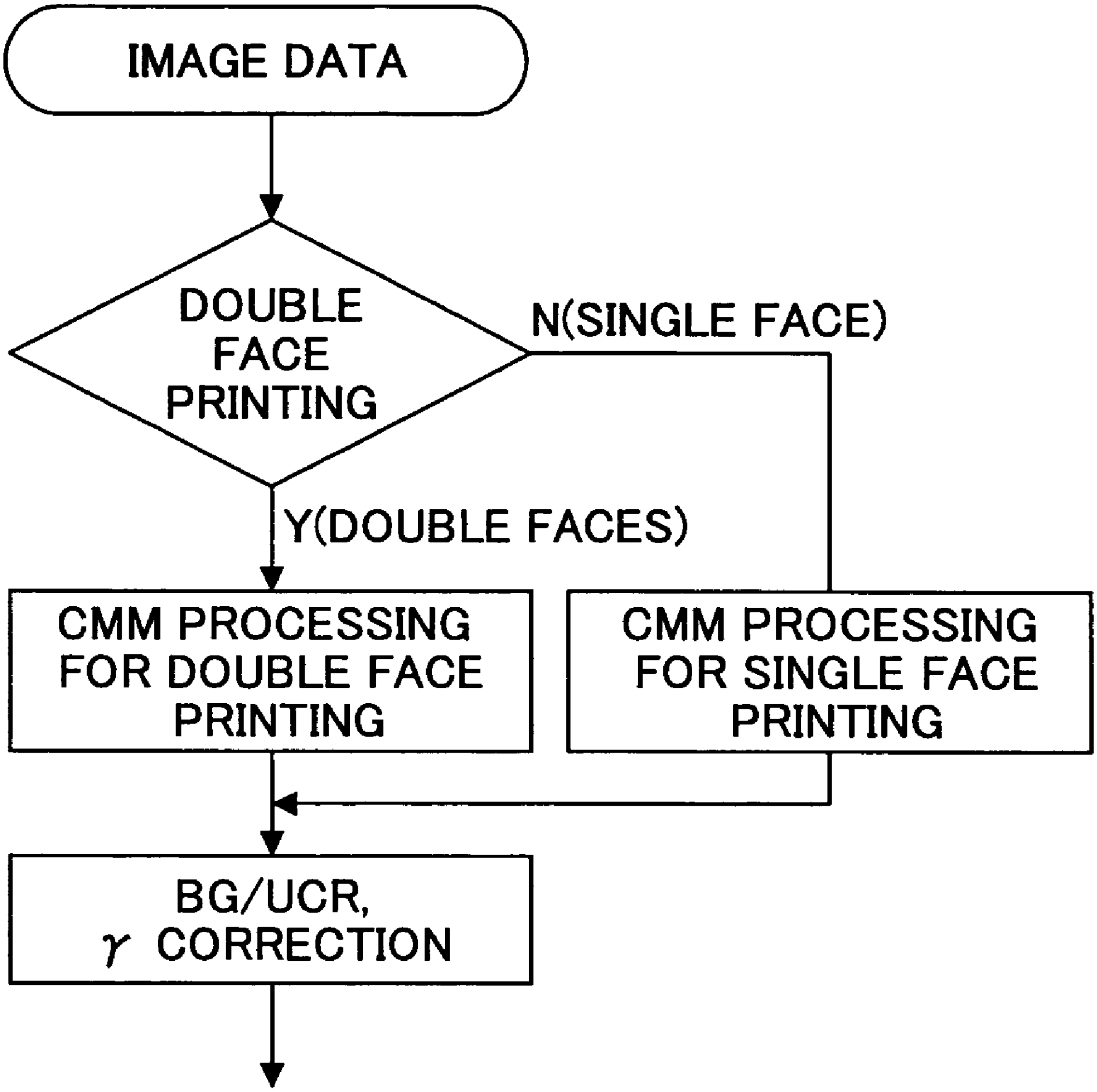
FIG. 11 is a flow diagram provided for illustrating a color space transformation process according to another embodiment of the present invention.

Also, in another embodiment of the present invention, as shown in FIG. 11, a color space processing transformation table for single face and a color space processing transformation table for double face obtained by multiplying it by a correction coefficient are previously prepared and whether double face printing or single face printing is determined, wherein, in the case of single face printing, a CMM process using the color space processing transformation table for single face (a CMM process for single face) is conducted and, in the case of double face printing, after a CMM process using the color space processing transformation table for double face (a CMM process for double face) is conducted, the obtained result is regarded as CMM values and transferred to the subsequent BG/UCR process.

Thus, since a CMM process is different between single face printing and double face printing, suppression is made for a color phase(s) for which an adhering recording liquid quantity that is problematic at the time of double face printing is reached and no suppression is made for other color phase(s), by taking an adhering recording liquid quantity and a color reproduction gamut for each color phase into consideration. Accordingly, a color gamut can be retained at the maximum for the double face printing and the decrease of color reproduction gamut for single face printing can be retained at the minimum, so that the lowering of image quality for the double face printing can be suppressed.

Also, one embodiment of an image processing method according to the present invention relates to a "CMM process" for transforming color space for monitor display to color space for an image forming apparatus (from an RGB color system to an CMY color system) in regard to input data, which is conducted in a color matching process and a total quantity regulating process for regulating the total quantity.

Figure 10B:
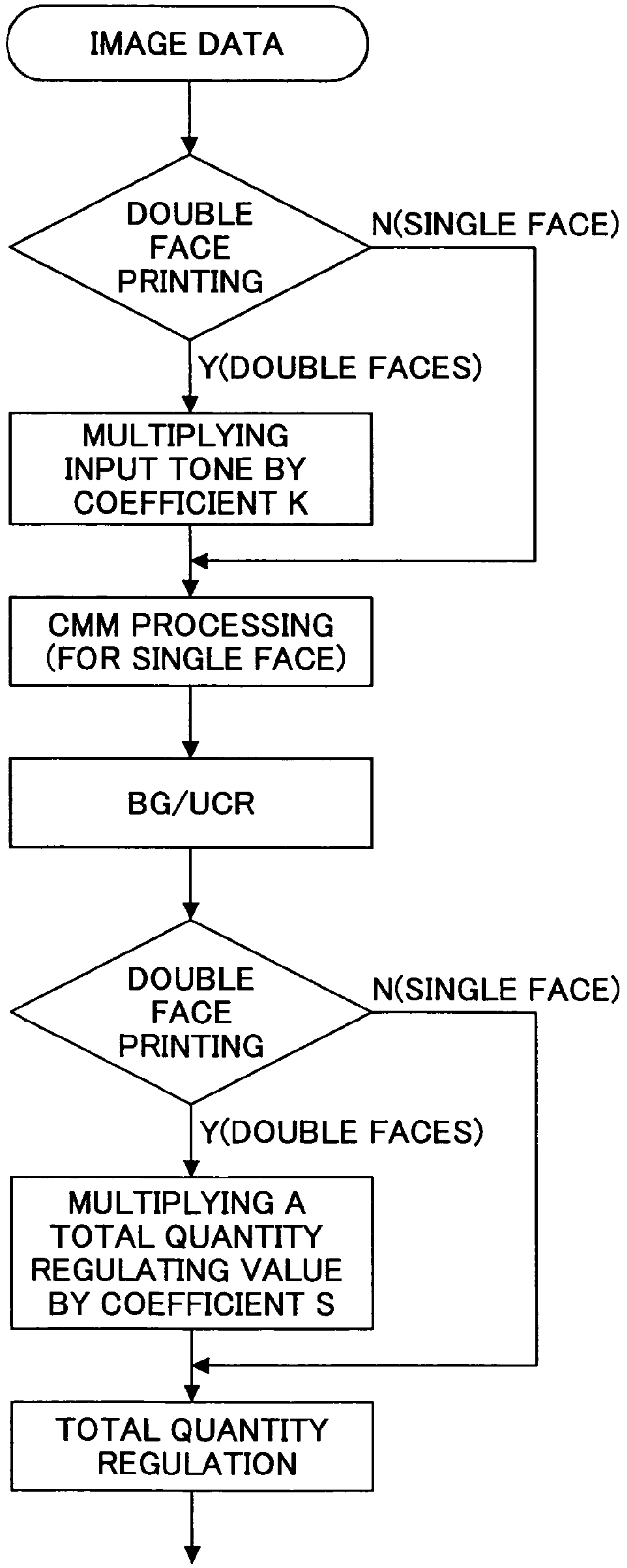
FIG. 10B is a flow diagram provided for illustrating one embodiment of the present invention.

In one embodiment of the present invention, as shown in FIG. 10B, when the image data 130 are inputted, whether double face printing or not is determined. In the case of double face printing, an input tone transformation process for providing a value as an input tone obtained by multiplying a certain coefficient K ($K<1.0$) by an input tone which is proportional to density (level) and a CMM process for transforming the input tone obtained by the input tone transformation process to an output tone using the color space processing transformation table is performed. Also, not in the case of double face printing (but in the case of single face printing), a CMM process is conducted using an original input tone and the color space processing transformation table and transfer to the subsequent BG/UCR process is made.

Then, after the BG/UCR process is conducted, whether double face printing or not is determined. In the case of double face printing, a value obtained by multiplying a certain coefficient S($S<1.0$) is used as a total quantity regulation value and, not in the case of double face printing (but in the case of single face printing), after an obtained total quantity regulation value is directly used to conduct the total quantity regulating process, transfer to the next process is made.

Thus, since the input tone transformation process and the adhering recording liquid quantity limiting process different from that for single face printing is conducted at the time of double face printing, waiting time for drying is reduced while the maximum image quality in a range in which no significant disadvantage is caused can be kept at the time of double face printing so that the lowering of density and unnatural tone of an image can be suppressed for the double face printing.

Figure 12A:
FIGS. 12A, 12B and 12C are illustrative diagrams provided for illustrating disadvantages by conventional correction methods at the time of double face printing.
Figure 12B:
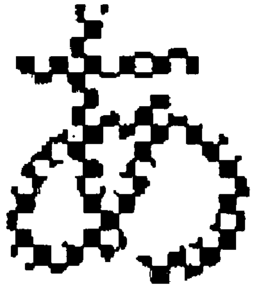
FIG.12B Prior Art
Figure 12C:
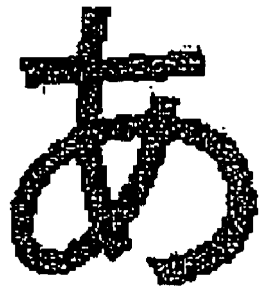

That is, as shown in FIGS. 12A, 12B, and 12C, in the case of performing a "thinning process" or "ejection quantity control" as described above which has been employed at the time of conventional double face printing, as a thinning process is conducted for an original image shown in FIG. 12A, a piece of image information is lacked in accordance with a thinning pattern as shown in FIG. 12B so as to lead to the obvious lowering of image quality, and as a ejection quantity control is performed, the density of an image is wholly lowered although no lack of image information is caused, as shown in FIG. 12C.

Figure 13A:
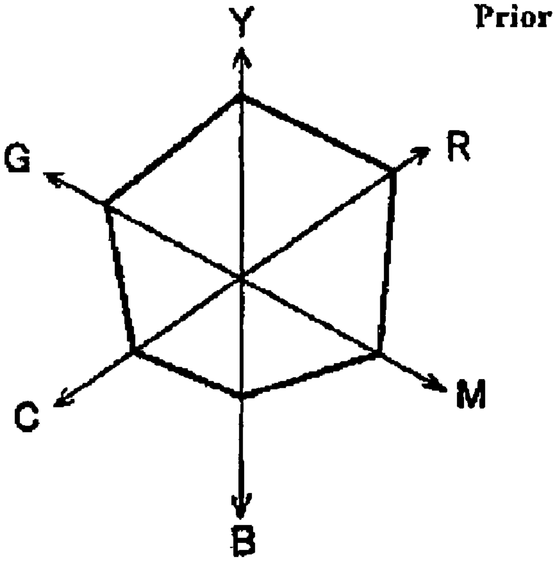
FIGS. 13A and 13B are illustrative diagrams provided for illustration from the viewpoint of color gamuts.
Figure 13B:
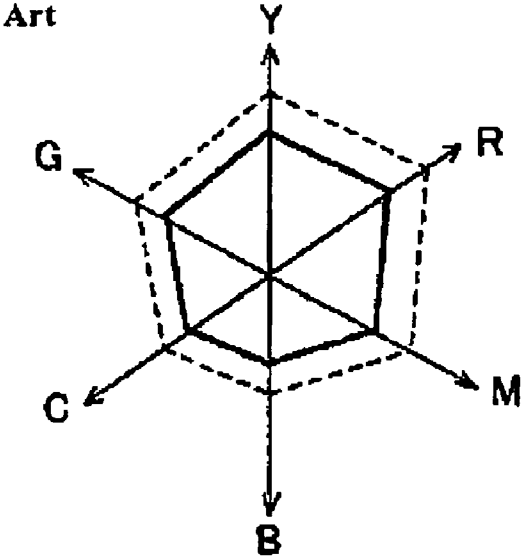
Prior Art FIG.13B

As shown in FIGS. 13A and 13B, as this matter is considered from the viewpoint of color reproduction gamut, a color reproduction gamut as shown in FIG. 13A is provided at the time of single face printing but the color reproduction gamut is uniformly narrowed as shown in FIG. 13B when the conventional correction is conducted. The color gamut reproduced in the direction of each color phase is changed depending on the composition of used ink or the regulation of the total quantity of ink which can adhere per a unit surface area. In regard to the quantity of adhering ink, the quantity of adhering ink is small for a color phase similar to a primary color represented by one ink-color and the quantity of adhering ink is large for a color similar to the middle between primary colors. In the conventional correction process, the effect of the correction uniformly influences the whole of color phase independently of the quantity of adhering ink of each color phases and the color space is similarly reduced compared to the case of single face printing.

Herein, for example, if the allowed maximum of the quantity of adhering ink which causes no significant problem for double face printing is the quantity of adhering ink in solid printing with a primary color, color reproduction comparable to the case of single face printing can be allowed in regard to a primary color phase, even for the case of double face printing in which ink adheres to both faces. Also, only a small number of a color gamut is reduced by the correction in regard to a color phase similar to a primary color and an impression such that image quality is lowered can be reduced to the minimum.

Figure 14:
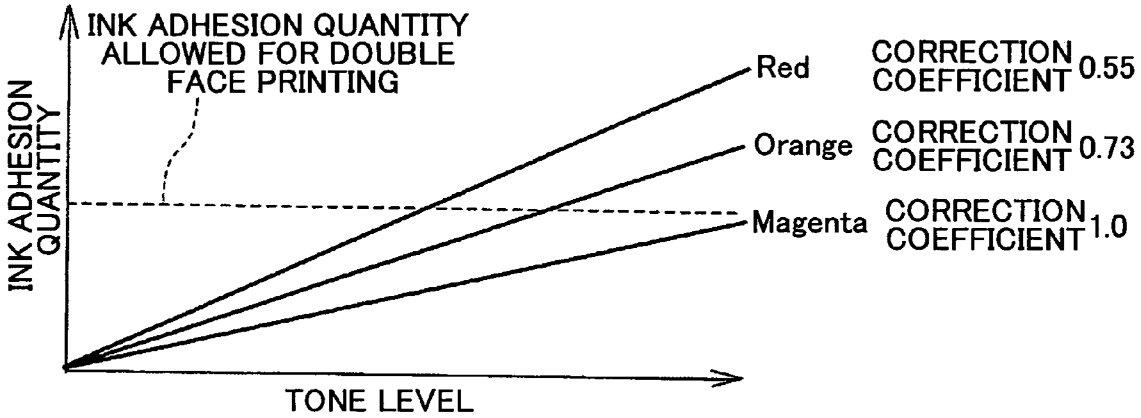
FIG. 14 is an illustrative diagram provided for illustrating a correction coefficient for a color space transformation process according to the present invention.
Figure 15A:
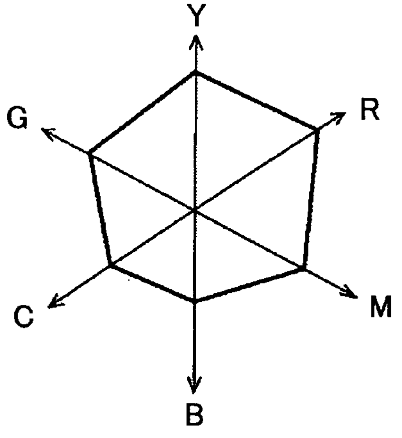
FIGS. 15A and 15B are illustrative diagrams provided for illustrating the cases of performing a color space transformation process according to the present invention from the viewpoint of color gamuts.
Figure 15B:
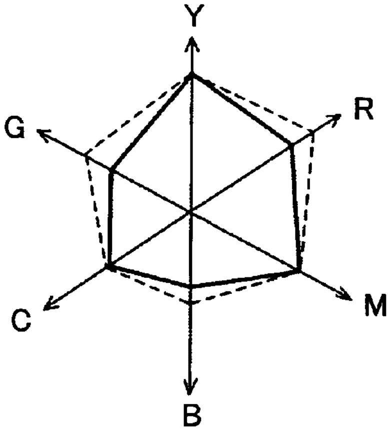

Then, in the present invention, a correction coefficient is calculated based on the quantity of adhering ink for each color phase and this correction coefficient is multiplied by an output value from the CMM process so that the maximum color gamut allowed for double face printing can be retained. For example, in an example as shown in FIG. 14, when the quantity of adhering ink is regulated to the quantity of adhering ink allowed for double face printing, a correction coefficient for magenta (M) is set to 1.0 (no correction) since the adhesion of ink with the allowed quantity thereof causes no significant problem, and a correction coefficient for orange (O) and a correction coefficient for red (R) are set to 0.73 and 0.55, respectively. Accordingly, from the view point of an color reproduction gamut, a color gamut at the time of double face printing is not similar to a color gamut at the time of single face printing as shown in FIG. 15.

Herein, since the change of the quantity of adhering ink corresponds to the change of a color phase from a primary color to a secondary color, when a correction coefficient multiply process (correction process) in accordance with the quantity of adhesion is applied, the continuity of tone or saturation between color phases is maintained.

Additionally, in the example shown in FIG. 14, the quantity of adhering ink allowed for double face printing is calculated as 1.1 times that of solid printing with ink of a primary color but it is only an example and not necessarily limited to this ratio. Since this ratio is changed depending on a paper form or a system configuration, a correction is conducted such that "the quantity of adhering ink after transformation the maximum quantity of adhering ink determined under the condition of double face printing".

However, since it is desired that image quality in solid printing with a primary color is ensured, a correction is preferably conducted such that the maximum quantity of adhering ink of a primary color≦the quantity of adhering ink after transformation≦the maximum quantity of adhering ink determined under the condition of double face printing".

Figure 16:
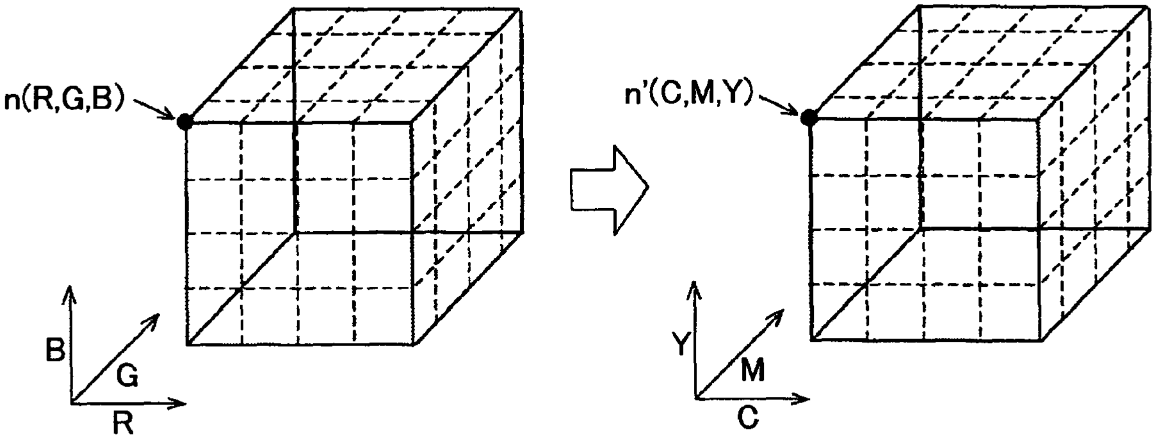
FIG. 16 is an illustrative diagram provided for illustrating a three-dimensional look-up table constituting CMM parameters.

Then, since CMM parameters commonly constitute a three-dimensional look-up table (LUT) as shown in FIG. 16, the correction coefficients similarly constitute a three-dimensional structure. In regard to the application of correction, as described above, an output value through a CMM parameter may be multiplied by a coefficient of the correction look-up table (an example of FIG. 10) or CMM parameters for double face printing which provide the same result as the case of previous coefficient multiplication and CMM parameters for single face printing may be prepared and used by switching them (an example of FIG. 11).

Additionally, CMM parameters or correction coefficients for multiplication switched at the tome of double face printing are not necessarily limited to one kind. That is, since various types of paper forms are distributed in the market, there are a paper form which is difficult to case a problem even if ink is more used at the time of double face printing and, on the other hand, a paper form with a stricter limitation. Plural CMM parameters or correction coefficients can be switched in response to user's selection or an automatic determination result by a paper form determination device mounted on an image forming apparatus.

Herein, the paper form automatic determination device may be a device for conducting the determination based on information on a paper form such as density, brightness or a color tone using a photo-sensor or an image reading device incorporated in the body of an image forming apparatus or an image forming system or a device for reading information such as bar code provided on a part of a paper form. Also, as a paper feeding tray (a paper feeding device) for paper forms with a previously specified brand is provided, that is, a paper form is associated with a paper feeding tray, double face printing dependent on a paper form can be conducted when outputting from an image forming apparatus at remote location through network.

Further, in an office environment, a so-called business document in which text and a graph image are combined is mainly output. For image data based on text, since the quantity of adhering ink per a unit surface area is small, the limitation to the quantity of adhering ink at the time of double face printing can be relaxed.

Therefore, the CMM parameters or correction coefficients can be switched for each object constituting image data, that is, text, a thin line, a graphic, a picture, etc., such that the text and the thin line are clearly provided and the maximum color gamut of the graphic and picture portion is maintained in a range of causing no significant problem.

Figure 17:
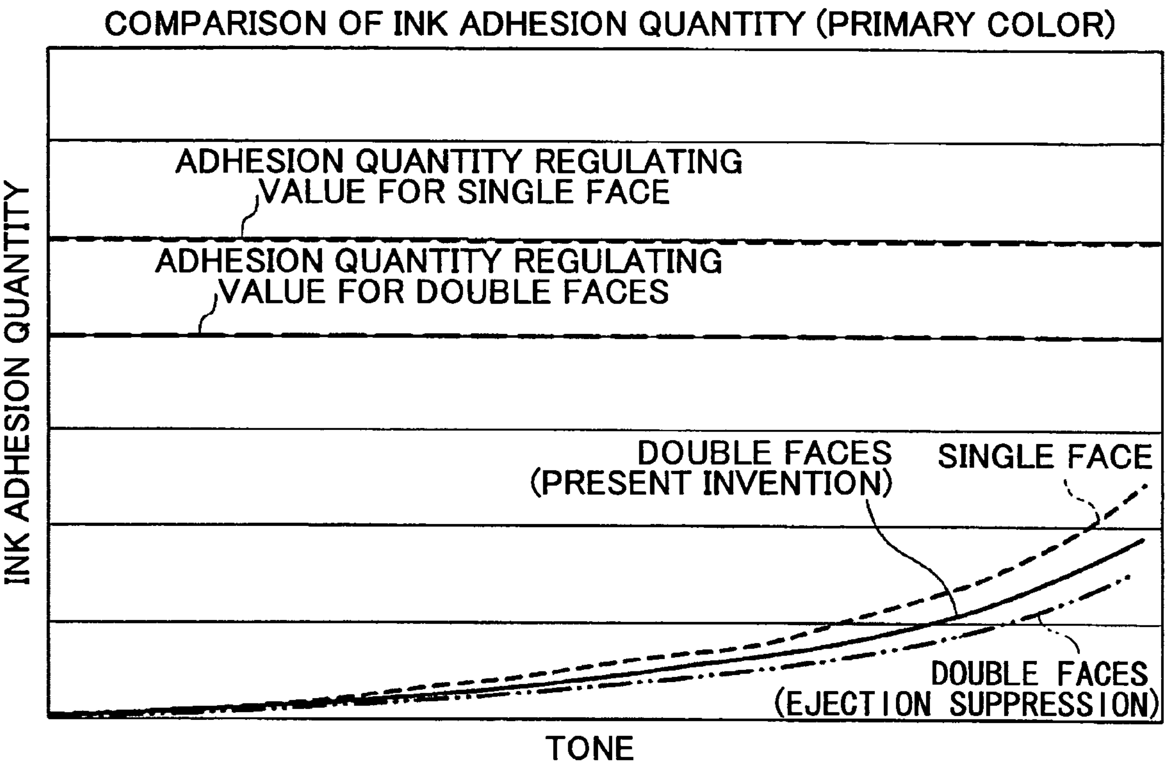
FIG. 17 is an illustrative diagram for illustrating the result of a comparison of the quantity of adhering ink with respect to a primary color among the cases where correction processes are performed based on a conventional "ejection quantity suppression" at the time of single face printing and double face printing and the case where a process for limiting the quantity of adhering ink is performed based on a tone correction process according to the present invention at the time of double face printing.
Figure 18:
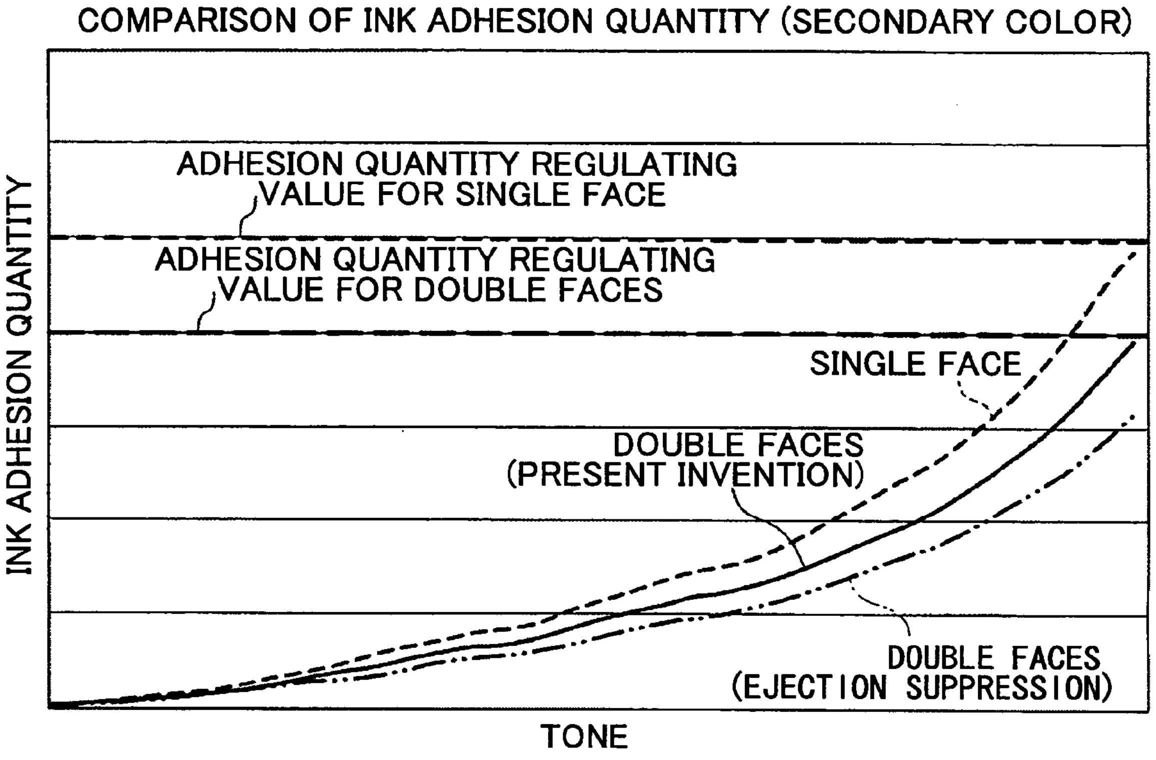
FIG. 18 is an illustrative diagram for illustrating the result of a similar comparison of the quantity of adhering ink with respect to a secondary color.
Figure 19:
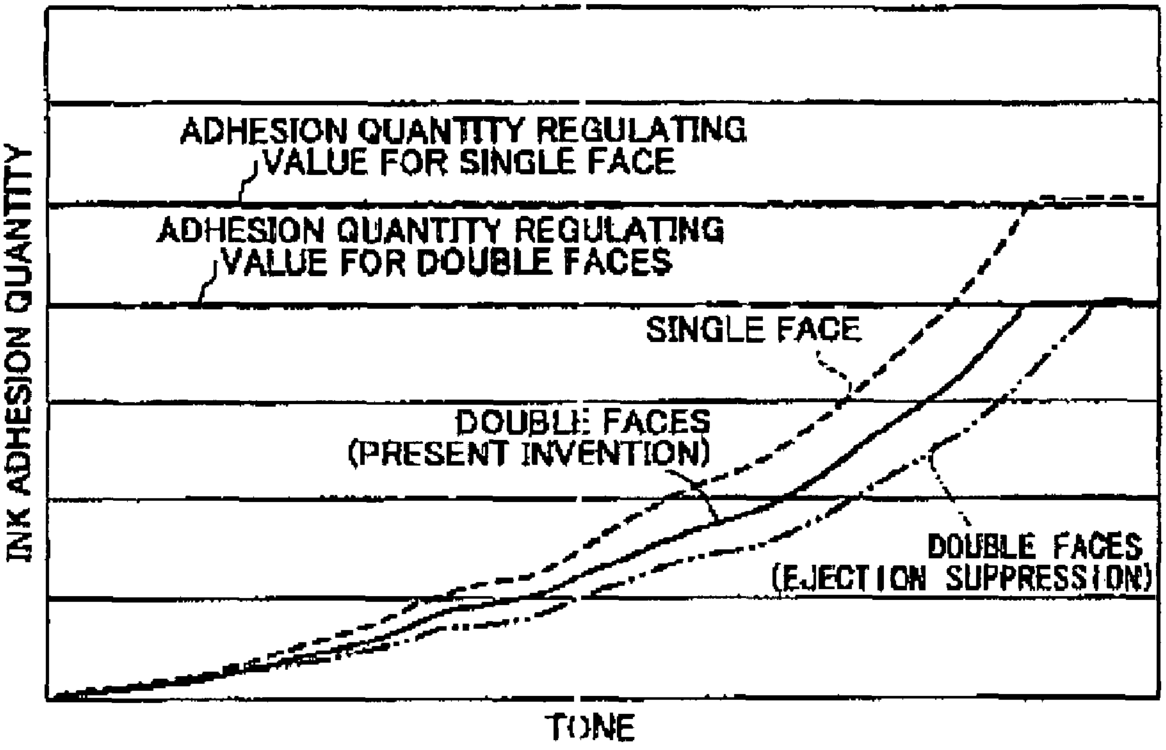
FIG. 19 is an illustrative diagram for illustrating the result of a similar comparison of the quantity of adhering ink with respect to a tertiary color.
Figure 20:
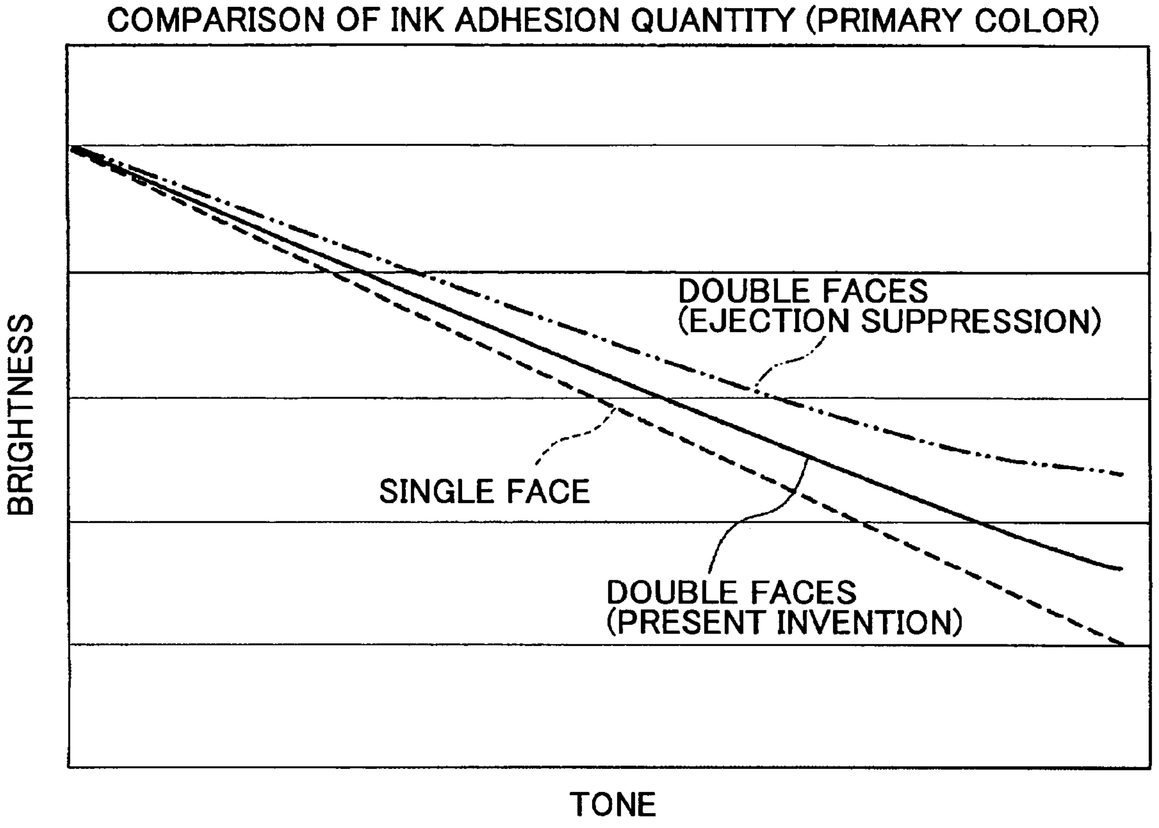
FIG. 20 is an illustrative diagram for illustrating one example of brightness tone characteristics with respect to a primary color among the cases where correction processes are performed based on a conventional "ejection suppression" at the time of single printing and double printing and the case where a tone correction process according to the present invention at the time of double printing.
Figure 21:
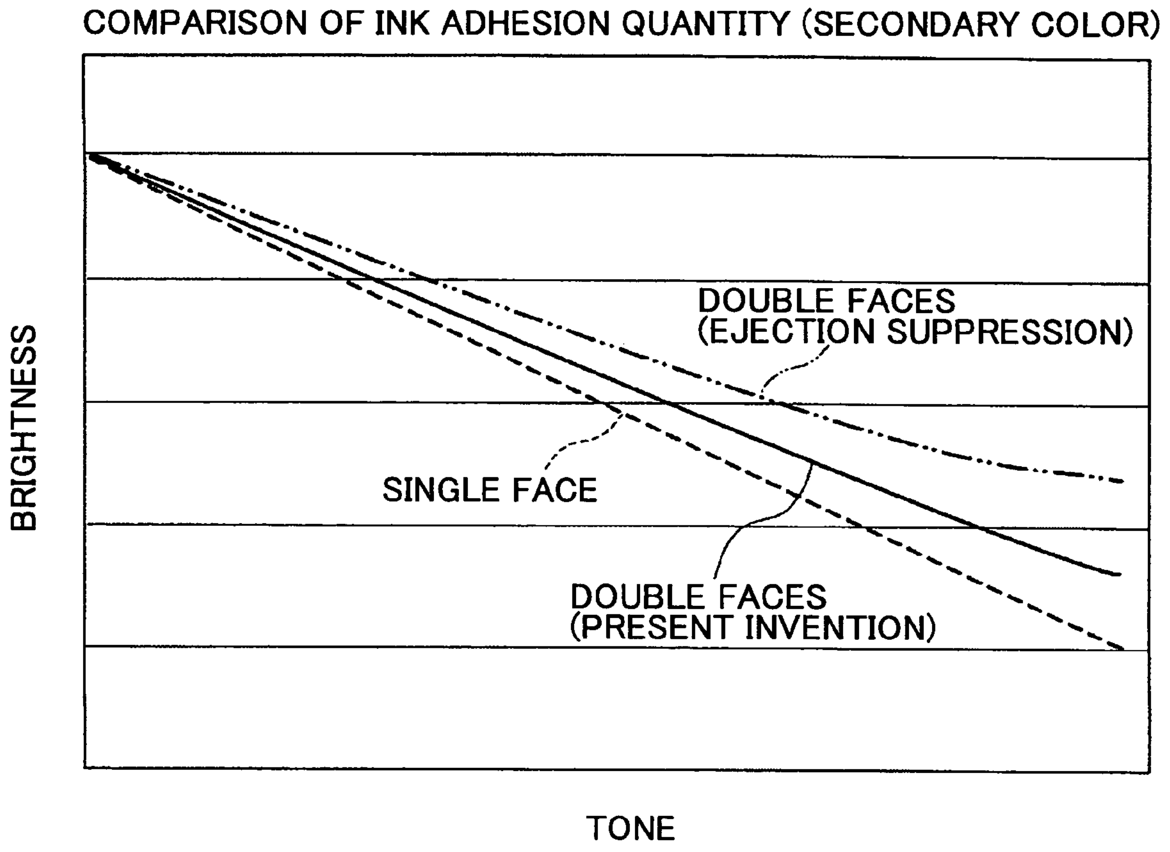
FIG. 21 is an illustrative diagram for illustrating one example of similar brightness tone characteristics with respect to a secondary color.
Figure 22:
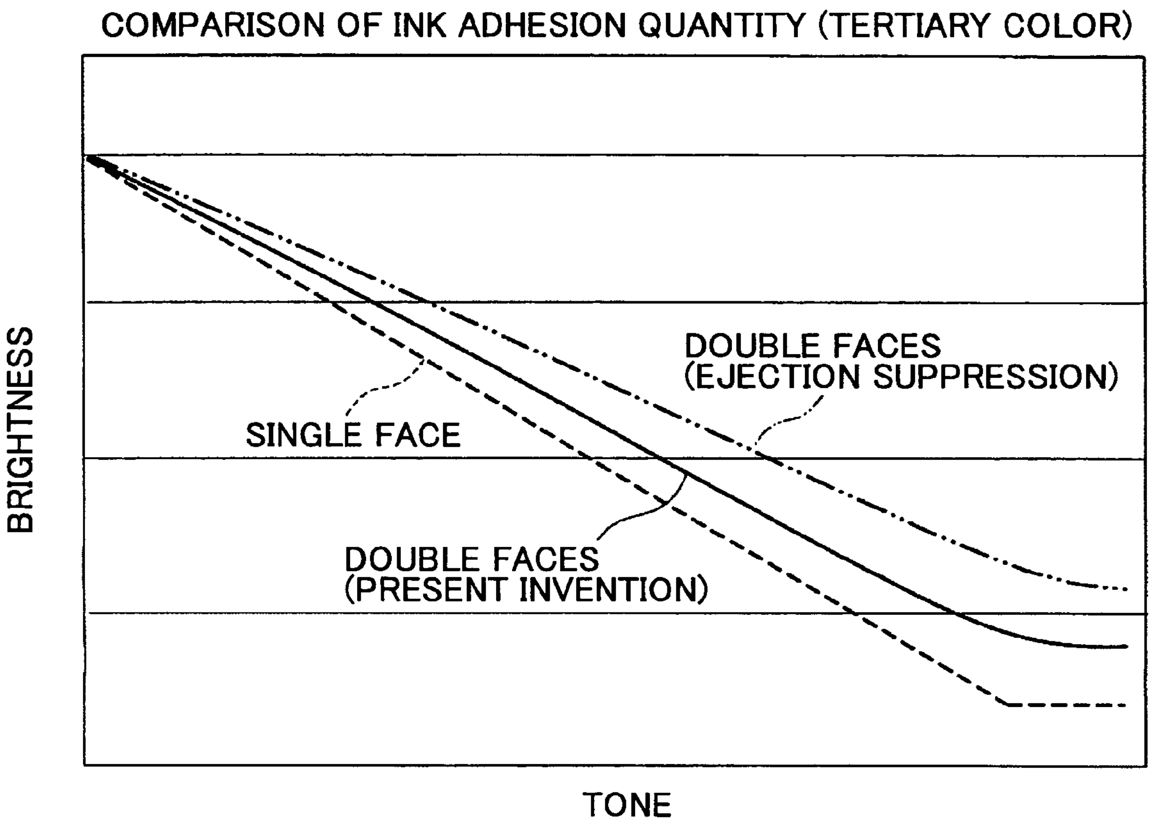
FIG. 22 is an illustrative diagram for illustrating one example of similar brightness tone characteristics with respect to a tertiary color.

Herein, FIGS. 17, 18 and 19 show comparison results of the quantity of adhering ink in the case where a correction process according to the conventional "ejection quantity suppression" is conducted at the time of single face printing or double face printing and the case where an "adhering ink quantity regulating process" by a tone correction process of the present invention is conducted at the time of double face printing. FIGS. 20, 21 and 22 show examples of a brightness tone characteristic in the case where a correction process according to the conventional "ejection quantity suppression" is conducted at the time of single face printing or double face printing and in the case where a tone correction process according to the present invention is conducted at the time of double face printing.

In the tone correction processing by the conventional "ejection quantity suppression", the ejection quantity is suppresses such that the maximum of the quantity of adhering ink at the time of double face printing is equal to or less than a quantity which causes no problematic image (referred to as "adhesion quantity regulation value for double face", below). In examples shown in FIGS. 17, 18 and 19, the ejection quantity has to be suppressed such that the quantity of adhering ink at the highest tone of a tertiary color for double face printing is equal to or less than "adhesion quantity regulation value for double face" (FIG. 19). As a result, the generation of a problematic image can be prevented but the quantity of adhering ink of a primary color or a secondary color is more largely changed at the time of double face printing than the case of single face printing (FIG. 17 and FIG. 18). Then, as shown in FIG. 20 and FIG. 22, a brightness tone characteristic is more largely changed at the time of double face printing than the case of single face printing.

Therefore, in the present invention, an "adhering ink quantity for single face (Max)/adhesion quantity regulation value for double face" based on the "adhesion quantity regulation value for double face" is provided as "ratio for double face (Min)", and the suppression to be equal to or less than the "adhesion quantity regulation value for double face" is always conducted, by multiplying a input tone of the CMM process (or by multiplying output tone of the CMM process) by "ratio for double face (coefficient K)" such that "ratio for double face (Min)<ratio for double face<1" and by outputting a tone immediately below the "adhesion quantity regulation value for double face" for a tone such that the quantity of adhering ink may be over the "total quantity regulation value for double face".

Accordingly, as shown in FIGS. 20, 21 and 22, the brightness tone characteristic at the time of double face printing is not largely changed compared to the brightness tone characteristic at the time of single face printing, and image quality can be maintained.

Then, "adhesion quantity regulation value for double face" is set by multiplying "adhesion quantity regulation value for single face" by a coefficient S such that "adhesion quantity regulation value for double face=S (adhesion ratio for double face)×adhesion quantity regulation value for single face" (S<1.0), so that the consumption of memory can be suppressed.

Figure 23:
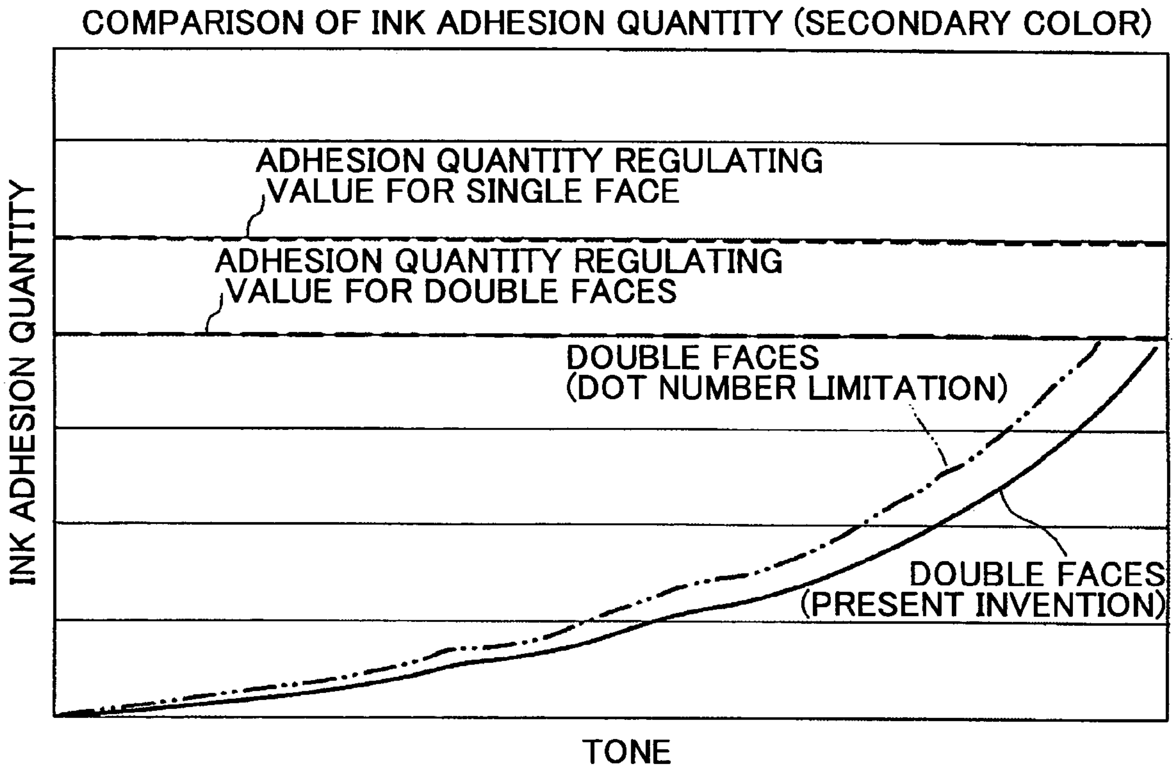
FIG. 23 is an illustrative diagram for illustrating the result of a comparison of the quantity of adhering ink with respect to a secondary color among the cases where correction processes are performed based on a conventional "dot number limitation" at the time of single face printing and double face printing and the case where a process for limiting the quantity of adhering ink is performed based on a tone correction process according to the present invention at the time of double face printing.
Figure 24:
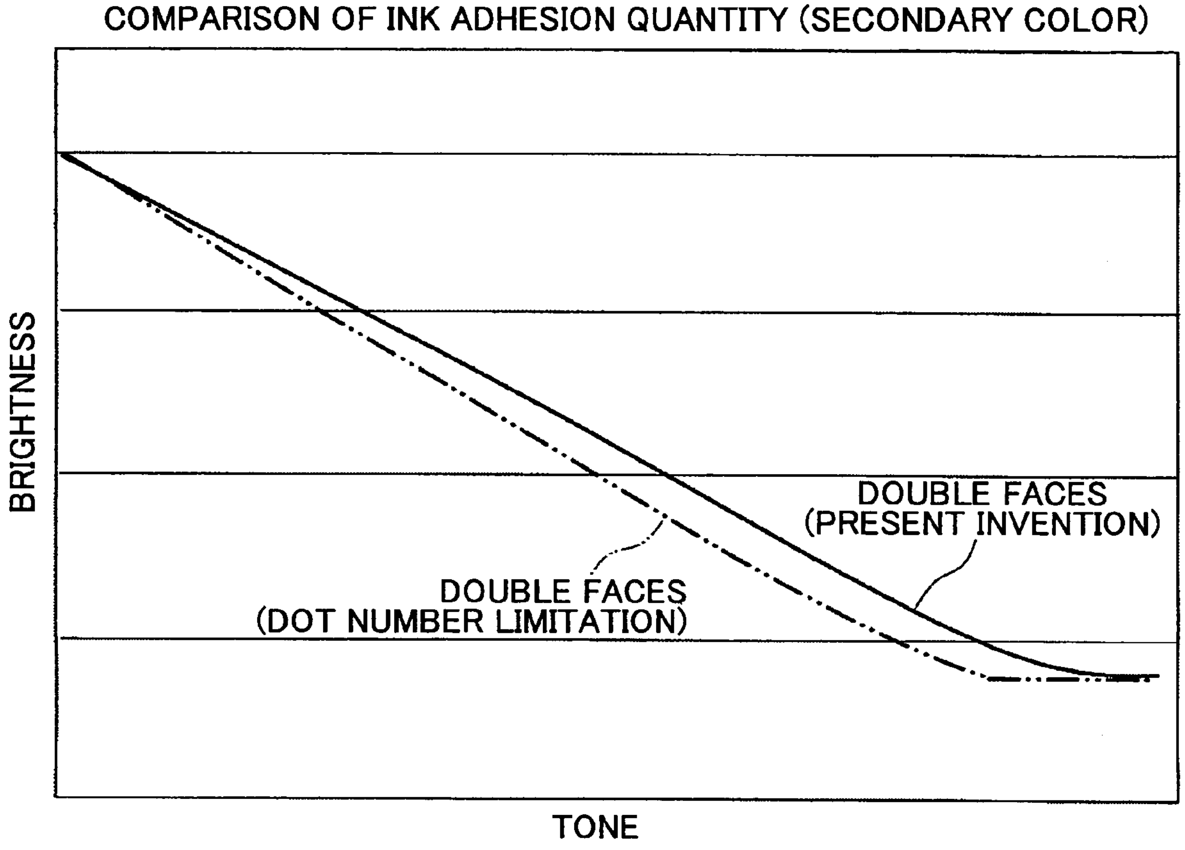
FIG. 24 is an illustrative diagram for illustrating one example of similar brightness tone characteristics with respect to a secondary color.

Next, FIG. 23 shows an example of the quantity of adhering ink in the case where a correction process based on the conventional "maximum dot number regulation" is conducted at the time of single face printing or double face printing or the case where an adhering ink quantity regulating process by a tone correction process according to the present invention is conducted for double face printing. Also, FIG. 24 shows an example of a brightness tone characteristic in the case where a correction process based on the conventional "maximum dot number regulation" is conducted at the time of single face printing or double face printing or the case where an adhering ink quantity regulating process by a tone correction process according to the present invention is conducted for double face printing.

In the tone correction process based on the conventional "maximum dot number", the ejection quantity is suppressed such that the maximum quantity of adhering ink at the time of double face printing is equal to or less than a quantity which causes no problematic image (referred to as "adhesion quantity regulation value for double face". In the example of FIG. 23, for a tone such that the quantity of adhering ink for a secondary color at the time of double face printing may be over "adhesion quantity regulation value for double face", the suppression to be equal to or less than the "adhesion quantity regulation value for double face" is always conducted by outputting a tone immediately below "adhesion quantity regulation value for double face". Accordingly, the generation of a problematic image can be prevented, but since the quantity of adhering ink is constant for a secondary color at the time of double face printing and a tone near the "adhesion quantity regulation value for double face", an unnatural image is provided such that the brightness tone characteristic near the "adhesion quantity regulation value for double face" for a secondary color at the time of double face printing is easily saturated, as shown in FIG. 24.

Herein, in the present invention, an "adhering ink quantity for single face, secondary color and highest tone/adhesion quantity regulation value for double face" based on the total quantity regulation value at the time of double face printing is provided as "ratio for double face (Min)", and the suppression to be equal to or less than the "adhesion quantity regulation values for double face" is conducted, by multiplying a input tone of the CMM process (or by multiplying output tone of the CMM process) by "ratio for double face" such that "ratio for double face (Min)<ratio for double face<1" and by outputting a tone immediately below the "adhesion quantity regulation value for double face" for a tone such that the quantity of adhering ink may be over the "adhesion quantity regulation value for double face" (FIG. 23). Accordingly, the frequency of use of a tone at which the brightness tone characteristic is saturated can be reduced and approximately highest tone which has a small visual influence can be provided so as to maintain image quality (FIG. 24).

Then, "adhesion quantity regulation value for double face" is set by multiplying "adhesion quantity regulation value for single face" by a coefficient S such that "adhesion quantity regulation value for double face=S (adhesion ratio for double face)×adhesion quantity regulation value for single face" (S<1.0), so that the consumption of memory can be suppressed.

Herein, the "ratio for double face" may be switched for each object (text, a thin line, a graphic, and an image) constituting output image data. For example, image quality can be maintained for any object by satisfying "(ratio for double face (Min)+1)/2<ratio for double face<1" for text and a thin line, the density of which may be important rather than the tone thereof, and by satisfying "(ratio for double face (Min)<ratio for double face<(ratio for double face (Min)+1)/2" for a graphic and an image, the tone naturalness of which is important.

Such a process can be implemented by setting the ratio for double face and adhesion ratio for double face used in the color matching process and total quantity regulating process for each object described above and shown in FIG. 9 to the "ratio for double face" adapted to the object described above.

Also, the "adhesion ratio for double face" can be switched for each object (text, a thin line, a graphic, and an image) constituting output image data. For example, image quality can be maintained for any object by providing an "adhesion ratio for double face" in which, for example, an image problem caused by transcription using a pressing control roller (a member denoted by 28 in FIG. 1) is taken into consideration, for text and a thin line which have comparatively small surface area for constituting the image thereof, and by setting the "adhesion ratio for double face" in which cockling is taken into consideration such that the adhesion ratios for double face satisfies the relationship of "for graphics and images<for text and thin lines" for a graphic and an image which have comparatively large surface area for constituting the image thereof.

Figure 25:
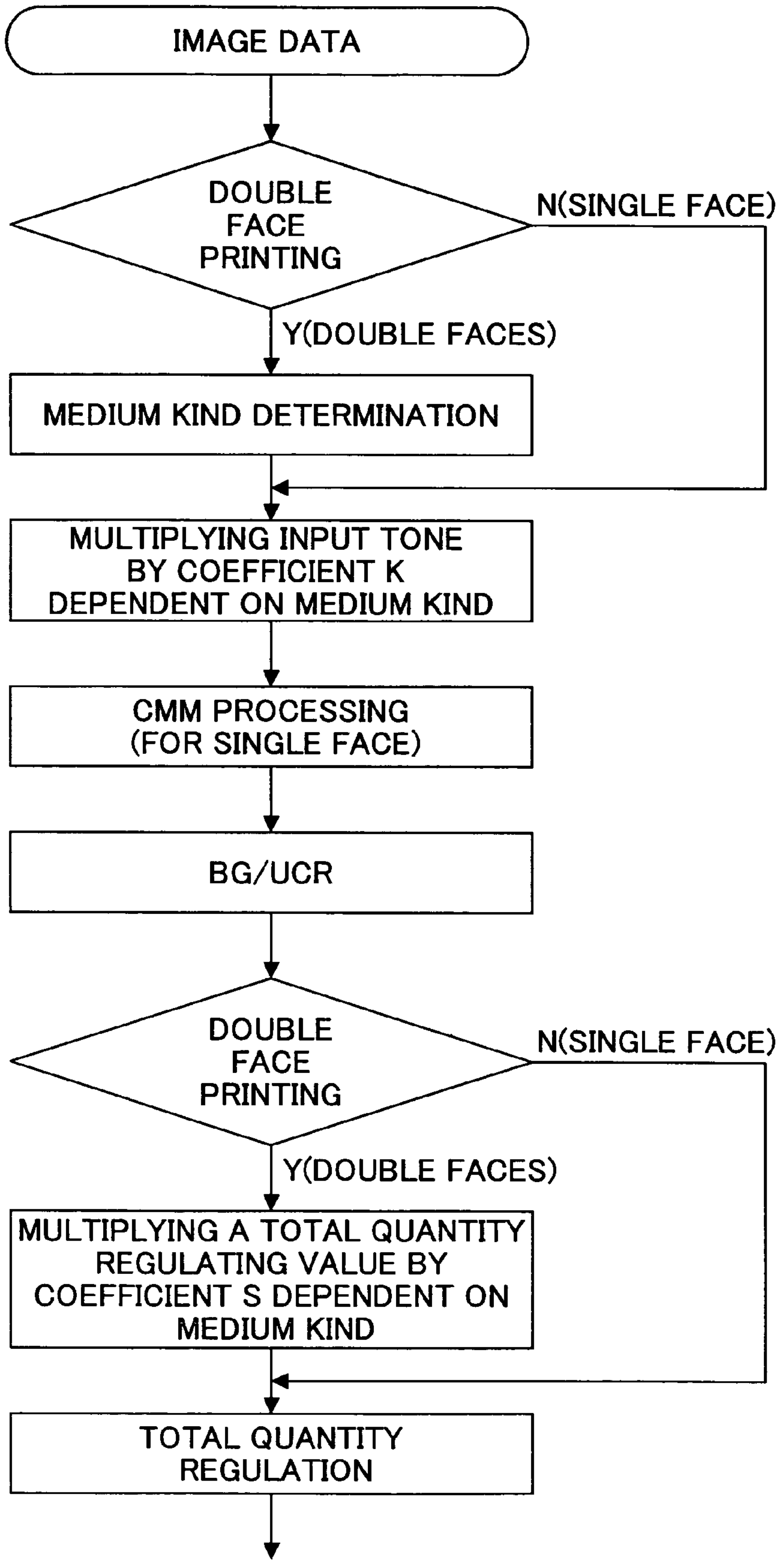
FIG. 25 is a flow diagram provided for illustrating another embodiment according to the present invention.
Figure 26:
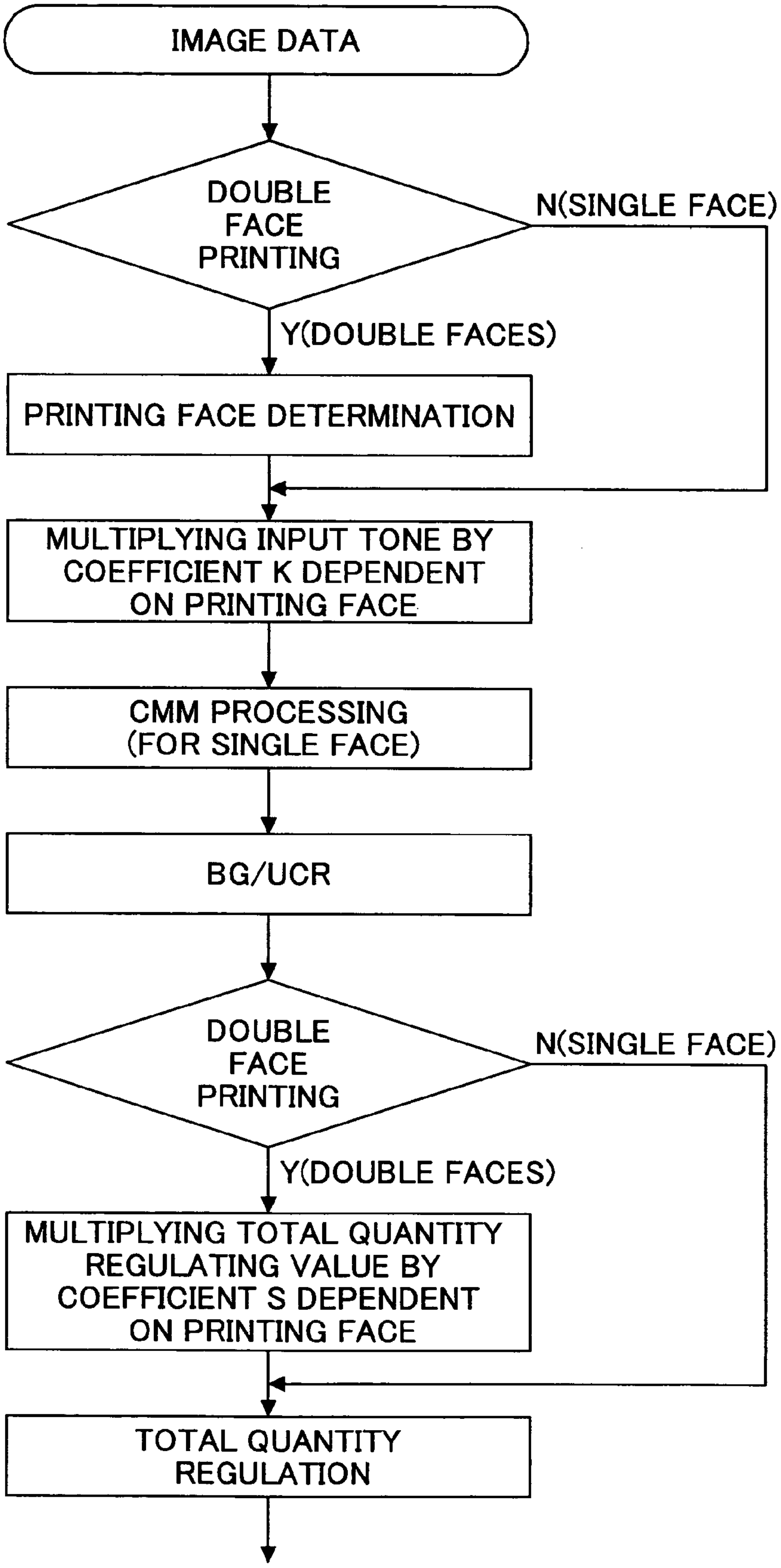
FIG. 26 is a flow diagram provided for illustrating yet another embodiment according to the present invention.

Also, the "ratio for double face" and the "adhesion ratio for double face" can be switched for each medium to be printed (medium to be recorded). For example, since the fixation property of ink is different between a normal paper and a post card, image quality can be maintained for each of media to be printed by setting the "ratio for double face" and the "adhesion ratio for double face" for each of a normal paper and a post card. One example of a process in this case is shown in FIG. 25. Another example of a process in this case is shown in FIG. 26.

Also, the "ratio for double face" and the "adhesion ratio for double face" can be switched between the first printed face and the second printed face. For example, for a post card, the "ratio for double face" and the "adhesion ratio for double face" for the first face are provided by taking a conveyance route, for example, a secondary transcription caused by transcription to the pressing control roller (a member denoted by 28 in FIG. 1) into consideration, and the "ratio for double face" and the "adhesion ratio for double face" for the second face are provided by taking back printing to a subsequently printed object. Then, the "ratio for double face" and the "adhesion ratio for double face" are set to satisfy the relationship of "for the second face<for the first face" whereby an image problem can be prevented while image quality can be maintained. One example of a process in this case is shown in FIG. 26.

Also, the "ratio for double face" and the "adhesion ratio for double face" can be switched depending on each of drying times after printing the first face and after printing the second face. For example, for a post card, the "frying time" for the first face is sat to "0" by taking a printing speed into consideration and the "ratio for double face" and the "adhesion ratio for double face" for the first face is provided by taking a conveyance route, for example, a secondary transcription caused by transcription to the pressing control roller (a member denoted by 28 in FIG. 1) into consideration. Then, the "frying time" for the second face is provided by taking back printing to a subsequently printed object and the "ratio for double face" and the "adhesion ratio for double face" for the second face is set to "0". Thus, an image problem can be prevented while image quality can be maintained. Such a process for this case can be implemented by changing the coefficients K and S dependent on the printed faces in FIG. 26 to values which are set based on the drying times.

Then, the setting can be made in the following ranges:

"drying time" (a): 0–arbitrary

"ratio for double face": 0–1

"adhesion ratio for double face": 0–1.

Particularly, an image problem can be prevented while image quality can be maintained, where "drying time" (s): 0–arbitrary "ratio for double face": "ratio for double face (Min)–(through) 1

"adhesion ratio for double face": adhesion quantity regulation value for double face/adhesion quantity regulation value for single face–(through) 1.

Additionally, in the embodiments described above, the image processing device is configured such that a printer driver as a program according to the present invention causes a computer to execute an image processing method according to the present invention, but the image forming apparatus itself may be configured to include a device for performing the image processing device described above. Also, an integrated circuit for a particular application (ASIC) which performs an image processing method according to the present invention may be mounted on the image forming apparatus.

Figure 27:
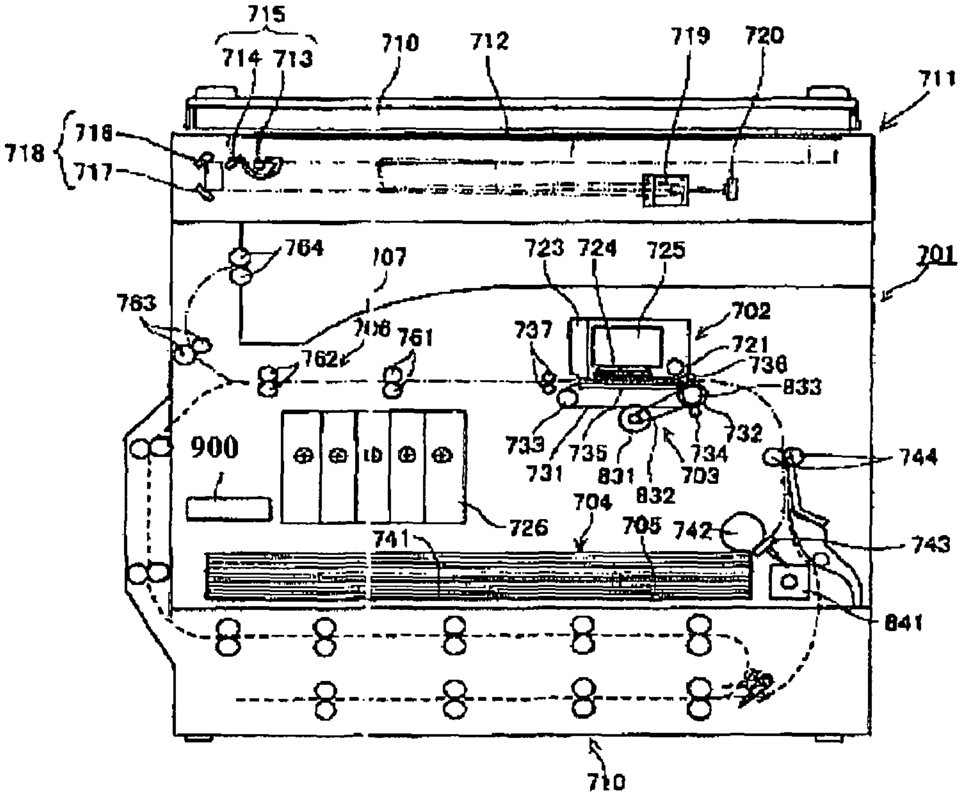
FIG. 27 is an illustrative diagram for illustrating the entire structure of one example of an image forming apparatus according to the present invention.

Herein, one example of an image forming apparatus (composite machine) in which the function of an ink jet recording apparatus and the function of a copying machine are integrated is described with reference to FIG. 27. Additionally, FIG. 27 is a schematic configuration diagram for illustrating the entire structure of the image forming apparatus.

The image forming apparatus has an image forming part (device) 702 for forming an image, a sub-scan conveyance part (device) 703 (the combination of both is referred to as a printer engine unit), etc., inside an apparatus body 701 (inside a housing). While a medium to be recorded (a paper from) 705 is paper-fed piece by piece from a paper feeding part (device) 704 provided on the bottom of the apparatus body 701 and the paper form 705 is conveyed to a location opposing the image forming part 702 by the sub-scan conveyance part 703, liquid drops are ejected from the image forming part 702 onto the paper form 705 so as to form (record) a desired image and, subsequently, the paper form 705 is paper-ejected onto an ejected paper tray 707 provided on the top of the apparatus body 701 through an ejected paper conveyance part 706. Also, in the case of double face printing, after the paper form 705 in which single face printing has been completed is sent from the side face of the apparatus body 701 to a lower double face unit 710 through the ejected paper conveyance part 706 and switched-back in the double face unit 710 so as to send the paper form 705 to the sub-scan conveyance part 703 again, printing is conducted on the other face and the paper form 705 is paper-ejected onto the ejected paper tray 707.

Also, the image forming apparatus includes an image reading part (a scanner part) 711 for reading an image on the top of the apparatus body 701 and above the ejected paper tray 707, as an input system of image data (printing data) formed in the image forming part 702. In the image reading part 711, an optical scanning system 715 including an illumination light source 713 and a mirror 714 and an optical scanning system 718 including mirrors 176 and 717 move so as to read an image on an original copy mounted on a contact glass 712 and the scanned image on the original copy is read as an image signal by an image reading element 720 arranged behind a lens 719. Then, the read image signal is digitized and image-processed and printing is made based on the image-processed printing data. Additionally, a pressure plate 710 is provided for fixing the original copy on the contact glass 712.

Further, the image forming apparatus can receive, via a cable or network, data, etc., including printing image data from a host such as an information processing device being an image processing device such as an external personal computer, as an input system of image data (printing image data) formed on the image forming part 702, an image reading device such as an image scanner and an imaging device such as a digital camera, and can process the received printing data so as to perform printing.

Herein, the image forming part 702 is a shuttle-type one for performing image formation by mounting a recording head 724 for ejecting liquid drops of plural colors different from each other on a carriage 723 which is guided by a guide rod 721 and can move in the main-scanning directions (directions orthogonal to a paper form conveying direction), moving the carriage 723 in the main-scanning directions by a carriage scanning mechanism, and conveying a paper form 705 to the paper form conveyance direction (a sub-scanning direction) by the sun-scan conveyance part 703 while liquid drops are ejected from the recording head 724, similarly to the ink jet recording apparatus described above.

The recording head 724 is composed of four liquid drop ejecting heads for ejecting black (Bk) ink, cyan (C) ink, magenta (M) ink, and yellow (Y) ink, respectively, and inks of respective colors are red from a sub-tank 725 mounted on the carriage 723. The inks are supplied or fed from ink cartridges 726 for respective colors which are main tanks detachably attached to the inside of the apparatus body 701, through tubes which are not shown in the figure, to the sub-tank 725.

The sub-scan conveyance part 703 includes a no-edge-shaped conveyance belt 731 hung on a conveyance roller 732 as a driving roller and a driven roller 733, for changing a direction of conveying a paper form 705 paper-fed from below by approximately 90 degrees and conveying it such that it is opposed to the image forming part 702, a charging roller 734 for applying an AC bias for charging the surface of the conveyance belt 731, a guide member 735 for guiding the conveyance belt 731 in area opposing the image forming part 702, a pressing control roller (pressurizing control roller) 736 for pressing the paper form 705 on the conveyance belt 731 at a position opposing the conveyance roller 732, and a conveyance roller 737 for sending the paper form 705 on which an image is formed by the image forming part 702 to the ejected paper conveyance part 706.

The conveyance belt 731 of the sub-scan conveyance part 703 is configured to rotate along the sub-scanning direction while the conveyance roller 732 is rotated by a sub-scanning motor 831 via a timing belt 832 and a timing roller 833.

The paper feeding part has a paper feeding cassette 741 which is attachable to and detachable from the apparatus body 701 and stacks and accommodates a number of paper forms 705, a paper feeding control roller 742 and friction pad 743 for separating and sending the paper form 705 in the paper feeding cassette 741 piece by piece, and a fed paper conveying roller 744 for conveying the paper-fed paper form 705 toward the sub-scan conveyance part 703. The paper feeding control roller 742 is rotated by a paper feeding motor 841 composed of a HB-type stepping motor via a paper feeding clutch which is not shown in the figure, and the fed paper conveying roller 44 is also driven and rotated by the paper feeding motor 141.

The ejected paper conveyance part 706 includes ejected paper conveyance roller pair 761 and 762 for conveying a paper form 705 on which an image is formed, and ejected paper conveyance roller pair 763 and ejected paper roller pair 764 for sending the paper form 705 to the ejected paper tray 707.

Figure 28:
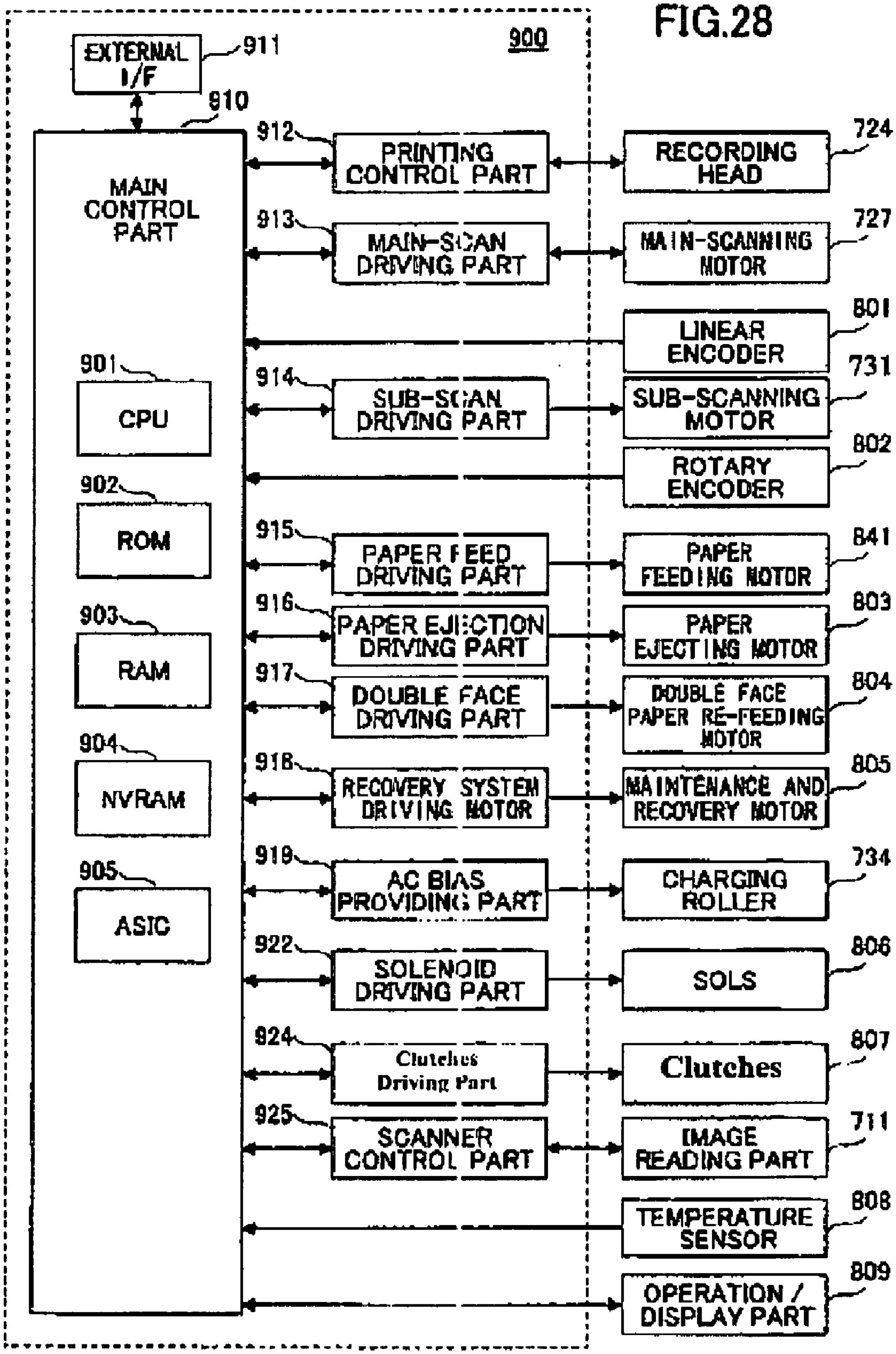
FIG. 28 is an illustrative block diagram for showing one example of a control part of the image forming apparatus.

Next, the control part of the image forming apparatus is generally described with reference to a block diagram of FIG. 28.

The control part 900 includes a main control part 910 for controlling the whole of the apparatus, which includes a CPU 901, a ROM 902 for storing a program and other fixed data executed by the CPU 901, a RAM 903 for temporally storing image data, etc., a nonvolatile memory (NVRAM) 904 for retaining the data while a power supply for the apparatus is turned off, and an ASIC 905 for conducting image processing according to the present invention which includes a half-tone processing to input image.

Also, the control part 900 includes an external I/F 911 for transmitted and receiving data or a signal, which is arranged between the host and the main control part 910, a printing control part 912 which includes a head driver for driving and controlling the recording head 724, a main-scanning driving part (motor driver) 913 for driving a main-scanning motor 927 for scan-moving the carriage 923, a sub-scanning driving part 914 for driving a sub-scanning motor 731, a paper feed driving part 915 for driving the paper feeding motor 841, a paper ejection driving part 916 for a paper ejecting motor 803 for driving each roller of the paper ejection part 706, a double face driving part 917 for driving a double face paper refeeding motor 804 for driving each roller of the double face unit 710, a recovery system driving part 918 for driving a maintenance and recovery motor 805 for driving a maintenance and recovery mechanism, and an AC bias providing part 919 for providing an AC bias to the charging roller 734.

Further, the control part 900 includes a solenoid driving part (driver) 922 for driving each kind of solenoid (SOL) 806, etc., a clutch driving part 924 for driving an electromagnetic clutch 807, etc., which relates to paper feeding, and a scanner controlling part 925 for controlling an image reading part 711.

Also, a detected signal from a temperature sensor 808 for detecting the temperature of the conveyance belt 731 described above is input into the main control part 910. Additionally, a detected signal from each kind of another sensor which is not shown in the figure is also input into the main control part 910, illustration of which signal is omitted in the figure. Also, the main control part 910 accepts a necessary key input from and outputs necessary display information on an operation/display part 809 which includes each kind of key such as ten keys and a print start key provided on the apparatus body 701 and each kind of a display device.

Further, an output signal (pulse) from a linear encoder 801 for detecting the movement and moving velocity of the carriage 723 and an output signal from a rotary encoder 802 for detecting the moving velocity and movement of the conveyance belt 731 are input into the main control part, and the control part 910 moves the carriage 723, moves the conveyance belt 731, and conveys a paper form 705, by driving and controlling the main-scanning motor 727 and the sub-scanning motor 731 via the main-scanning driving part 913 and the sub-scanning driving part 914, based on respective output signals and the relationship among these output signals.

As an image forming operation in thus configured image forming apparatus is briefly described, since the charging roller 734 contacts an insulating layer (front layer) of the conveyance belt 731, when a high voltage composed of positive and negative rectangular waves and being an alternating voltage from the AC bias providing part 919 is applied to the charging roller 734, a positive charge and a negative charge are alternately and zonally applied on the front layer of the conveyance belt 731 in the conveyance directions of the conveyance belt 731. Then, charging with a predetermined charging width is conducted on the conveyance belt 731 and ununiform electric field is produced.

Herein, as a paper form 705 is paper-fed from the paper feeding part 704 and sent onto the conveyance belt 731 between the conveyance roller 732 and the pressing control roller 736 on which belt positive and negative charges are formed to generate the ununiform electric field, the paper form 705 polarizes according to the direction of the electric field, is held on the conveyance belt 731 by an electrostatic attractive force, and is conveyed with the movement of the conveyance belt 731.

Then, while the paper form 705 is intermittently conveyed by the conveyance belt 731, liquid drops of recording liquid are ejected from the recording head 724 onto the paper form 705 in accordance with printing data so as to form (print) an image and the paper form 705 on which an image is formed is separated on the side of the tip thereof from the conveyance belt 731 by a separation claw and paper-ejected onto the ejected paper tray 707 by the ejected paper conveyance belt 706.

Also, in such an image forming apparatus, since an image of an original copy read by the scanner part 711 is an input image and an input tone transforming process and an adhering recording liquid quantity regulating process which are different from those of single face printing are conducted at the time of double face printing as described above, while a waiting time for drying can be reduced, image quality can be retained at the maximum in a range of causing no problem at the time of double face printing and the lowering of the density of an image and unnaturalness of the tone thereof can be suppressed for double face printing.

Additionally, in the embodiments described above, the total quantity regulation has been described such that it confronts the ejection quantity control as an adhering ink quantity regulating process and dot number regulation, but the ejection quantity control or the dot number regulation can be also used in combination with the input tone processing.

The present invention is not limited to the specifically disclosed embodiments, and variations and modifications may be made without departing from the scope of the present invention.

APPENDIX (1-1) An image processing method for producing and processing image data based on input data which image data are sent to an image forming apparatus for forming an image on a paper form on which apparatus a recording head for ejecting a liquid drop of recording liquid is mounted and which apparatus is capable of performing double face printing, wherein color space transformation processes different between single face printing and double face printing are performed when input data are transformed into color space values for the image forming apparatus.

(1-2) The image processing method as described in (1-1) above, wherein color space reproduced by a color space transformation process applied at the time of double face printing is a maximum color gamut realizable from an adhering recording liquid quantity such that an adhering recording liquid quantity after transformation=a maximum adhering recording liquid quantity determined at the time of double face printing.

(1-3) The image processing method as described in (1-1) above, wherein color space reproduced by a color space transformation process applied at the time of double face printing is a maximum color gamut realizable from an adhering recording liquid quantity such that a maximum adhering recording liquid quantity with respect to a primary color in a color space after transformation≦an adhering recording liquid quantity after transformation≦a maximum adhering recording liquid quantity determined at the time of double face printing.

(1-4) The image processing method as described in any of (1-1) through (1-3) above, wherein color space transformation processes different among objects constituting output image data at the time of double face printing are performed.

(1-5) The image processing method as described in any of (1-1) through (1-4) above, wherein different color space transformation processes are performed by switching predetermined plural color space processing transformation tables.

(1-6) The image processing method as described in any of (1-1) through (1-4) above, wherein different color space transformation processes are performed by switching predetermined coefficient tables multiplied by an output value from a color space processing transformation table as a basis.

(1-7) The image processing method as described in (1-5) or (1-6) above, wherein whether the kind of a paper form is capable of performing double face printing or not is determined based on a detection result for a brightness or density of a paper form and switching of the table is performed based on the determination result.

(1-8) The image processing method as described in (1-5) or (1-6) above, wherein switching of the table is performed based on a detection result from a paper feeding device which previously corresponds to a kind of a paper form.

(1-9) The image processing method as described in (1-5) or (1-6) above, wherein switching of the table is performed based on a selection result of a user.

(1-10) A program for causing a computer to execute a process for producing image data based on input data which image data are sent to an image forming apparatus for forming an image on which apparatus a recording head for ejecting a liquid drop of recording liquid is mounted, wherein the image processing method as described in any of (1-1) through (1-9) above is executed by a computer.

(1-11) An image forming apparatus for forming an image based on input data on which apparatus a recording head for ejecting a liquid drop of recording liquid is mounted, which apparatus comprises an integrated circuit for a particular application on which the image processing method as described in any of (1-1) through (1-9) above is performed.

(1-12) An image forming system comprising the image processing device as described in (1-10) above and an image forming apparatus for forming an image on which apparatus a recording head for ejecting a liquid drop of recording liquid is mounted.

(1-13) An image forming system comprising the image forming apparatus as described in (1-12) above and an image processing device for sending image data to the image forming apparatus.

(2-1) An image processing method for producing and processing image data based on input data which image data are sent to an image forming apparatus for forming an image on a paper form on which apparatus a recording head for ejecting a liquid drop of recording liquid is mounted and which apparatus is capable of performing double face printing, wherein input tone transformation processes and adhering recording liquid quantity limiting processes different between a case where double face printing is performed and a case where single face printing is performed are performed.

(2-2) The image processing method as described in (2-1) above, wherein an input tone transformation process is a process for multiplying a certain coefficient K (K≦1.0) by an input tone which is proportional to a density when double face printing is performed.

(2-3) The image processing method as described in (2-2) above, wherein coefficient K is switched depending on an object constituting output image data.

(2-4) The image processing method as described in (2-2) or (2-3) above, wherein coefficient K is switched depending on a kind of the paper form.

(2-5) The image processing method as described in any of (2-2) through (2-4) above, wherein coefficient K is switched depending on whether a surface for forming an image is a first surface or a second surface.

(2-6) The image processing method as described in any of (2-1) through (2-5) above, wherein coefficient K is switched depending on drying time for a first surface and a second surface after an image is formed.

(2-7) The image processing method a described in any of (2-1) through (2-6) above, wherein an adhering recording liquid quantity limiting process is a process for multiplying a certain coefficient S(S≦1.0) by an adhering recording liquid quantity limiting value which is obtained by a same adhering recording liquid quantity limiting process as that of single face printing when double face printing is performed.

(2-8) The image processing method a described in (2-7) above, wherein coefficient S is switched depending on an object constituting output image data.

(2-9) The image processing method as described in (2-7) or (2-8) above, wherein coefficient S is switched depending on a kind of the paper form.

(2-10) The image processing method as described in any of (2-7) through (2-9) above, wherein coefficient S is switched depending on whether a surface for forming an image is a first surface or a second surface.

(2-11) The image processing method as described in any of (2-7) through (2-10) above, wherein coefficient S is switched depending on drying time of a first surface and a second surface after an image is formed.

(2-12) A program for causing a computer to execute a process for producing image data based on input data which image data are sent to an image forming apparatus for forming an image on which apparatus a recording head for ejecting a liquid drop of recording liquid is mounted and which apparatus is capable of performing double face printing, wherein the image processing method as described in any of (2-1) through (2-11) above is executed by a computer.

(2-13) An image processing device for performing a process for producing image data based on input data which image data are sent to an image forming apparatus for forming an image on which apparatus a recording head for ejecting a liquid drop of recording liquid is mounted and which apparatus is capable of performing double face printing, which device comprises a device for performing the image processing method as described in any of (2-1) through (2-11) above.

(2-14) An image forming apparatus for forming an image based on input data on which apparatus a recording head for ejecting a liquid drop of recording liquid is mounted and which apparatus is capable of performing double face printing, which apparatus comprises a device for performing the image processing method as described in any of (2-1) through (2-11) above.

(2-15) The image forming apparatus as described in (2-14) above, wherein the device is an integrated circuit for a particular application.

(2-16) An image forming system comprising an image processing device as described in (2-13) above and an image forming apparatus for forming an image on which apparatus a recording head for ejecting a liquid drop of recording liquid is mounted and which apparatus is capable of performing double face printing.

(2-17) An image forming system comprising the image forming apparatus as described in (2-14) or (2-15) above and an image processing device for sending image data to the image forming apparatus.

The present application is based on Japanese priority application No. 2005-253017 filed on Sep. 1, 2005 and Japanese priority application No. 2005-310113 filed on Oct. 25, 2005, the entire contents of which are hereby incorporated by reference.

What is claimed is:

1. An image processing method for producing and processing image data based on input data which image data are sent to an image forming apparatus for forming an image on a paper form on which apparatus a recording head for ejecting a liquid drop of recording liquid is mounted and which apparatus is capable of performing double face printing, wherein color space transformation processes that differ between single face printing and double face printing are performed when input data are transformed into color space values for the image forming apparatus, (i) by multiplying an input tone of a color management process by a ratio for double face, such that a ratio of an adhering ink quantity for single face, secondary color and highest tone to an adhesion quantity regulation value for double face is less than a ratio for double face, and the ratio for double face is less than one, and (ii) by outputting a tone immediately below the adhesion quantity regulation value for double face for a tone such that the adhering ink quantity is over the adhesion quantity regulation value for double face.

2. The image processing method as claimed in claim 1, wherein a color space reproduced by a color space trans formation process applied at a time of double face printing is a maximum color gamut realizable from an adhering recording liquid quantity such that an adhering recording liquid quantity after transformation is equal to a maximum adhering recording liquid quantity determined at the time of double face printing.

3. The image processing method as claimed in claim 1, wherein a color space reproduced by a color space transformation process applied at a time of double face printing is a maximum color gamut realizable from an adhering recording liquid quantity such that a maximum adhering recording liquid quantity with respect to a primary color in a color space after transformation is less than or equal to an adhering recording liquid quantity after transformation, and the adhering recording liquid quantity after transformation is less than or equal to a maximum adhering recording liquid quantity determined at the time of double face printing.

4. The image processing method as claimed in claim 1, wherein color space transformation processes that differ among objects constituting output image data are performed at a time of double face printing.

5. The image processing method as claimed in claim 1, wherein different color space transformation processes are performed by switching predetermined plural color space processing transformation tables.

6. The image processing method as claimed in claim 1, wherein different color space transformation processes are performed by switching predetermined coefficient tables multiplied by an output value from a color space processing transformation table as a basis.

7. A program product including a computer readable medium tangibly executable by a computer to perform the image processing method as claimed in claim 1.

8. An image processing device including a device configured to perform the image processing method as claimed in claim 1.

9. Said image forming apparatus comprising a device configured to perform the image processing method as claimed in claim 1.

10. A computer readable medium tangibly embodying a program of instructions executable by a computer to perform the image processing method as claimed in claim 1.

11. An image processing method for producing and processing image data based on input data which image data are sent to an image forming apparatus for forming an image on a paper form on which apparatus a recording head for ejecting a liquid drop of recording liquid is mounted and which apparatus is capable of performing double face printing, wherein input tone transformation processes and adhering recording liquid quantity limiting processes that differ between double face printing and single face printing are performed, (i) by multiplying an input tone of a color management process by a ratio for double face, such that a ratio of an adhering ink quantity for single face, secondary color and highest tone to an adhesion quantity regulation value for double face is less than a ratio for double face, and the ratio for double face is less than one, and (ii) by outputting a tone immediately below the adhesion quantity regulation value for double face for a tone such that the adhering ink quantity is over the adhesion quantity regulation value for double face.

12. The image processing method as claimed in claim 11, wherein an input tone transformation process is a process for multiplying a certain coefficient K ($K \leqq 1.0$) by an input tone which is proportional to a density when double face printing is performed.

13. The image processing method as claimed in claim 11, wherein an adhering recording liquid quantity limiting process is a process for multiplying a certain coefficient S (S≦1.0) by an adhering recording liquid quantity limiting value which is obtained by a same adhering recording liquid quantity limiting process as that of single face printing when double face printing is performed.

14. A program product including a computer readable medium tangibly embodying instructions executable by a computer to perform the image processing method as claimed in claim 11.

15. An image processing device comprising a device configured to perform the image processing method as claimed in claim 11.

16. Said image forming apparatus comprising a device configured to perform the image processing method as claimed in claim 11.

17. A computer readable medium tangibly embodying a program of instructions executable by a computer to perform the image processing method as claimed in claim 11.

18. The image processing method as claimed in claim 11, wherein said adhesion quantity regulation value for double face is set by multiplying an adhesion quantity regulation value for single face by a coefficient S, S being less than 1.0.

* * * * *